United States Patent
Hossain

(10) Patent No.: US 12,158,428 B1
(45) Date of Patent: *Dec. 3, 2024

(54) METHOD FOR FORMING SUBSTRATE WITH GOLD SURFACE

(71) Applicant: KING FAHD UNIVERSITY OF PETROLEUM AND MINERALS, Dhahran (SA)

(72) Inventor: Mohammad Kamal Hossain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/788,237

(22) Filed: Jul. 30, 2024

Related U.S. Application Data

(63) Continuation of application No. 18/319,055, filed on May 17, 2023, now Pat. No. 12,117,399, which is a
(Continued)

(51) Int. Cl.
   *G01N 21/65* (2006.01)
   *B05D 5/00* (2006.01)
   *B05D 7/24* (2006.01)

(52) U.S. Cl.
   CPC ............. *G01N 21/658* (2013.01); *B05D 5/00* (2013.01); *B05D 7/24* (2013.01)

(58) Field of Classification Search
   CPC .................................................. G01N 21/658
   See application file for complete search history.

(56) References Cited

U.S. PATENT DOCUMENTS

| 7,397,558 B2 | 7/2008 | Kamins et al. |
| 10,088,478 B2 | 10/2018 | Dai et al. |

(Continued)

FOREIGN PATENT DOCUMENTS

| KR | 10-2017-0094926 | 8/2017 |

OTHER PUBLICATIONS

Hossain et al., Nanoassembly of gold nanoparticles: An active substrate for size-dependent surface-enhanced Raman scattering, Aug. 2020, Spectrachimica Acta Part A:Molecular and Biomolecular Spectroscopy, pp. 1-9 (Year: 2020).*

(Continued)

*Primary Examiner* — Dah-Wei D. Yuan
*Assistant Examiner* — Andrew J Bowman
(74) *Attorney, Agent, or Firm* — Oblon, McClelland, Maier & Neustadt, L.L.P.

(57) ABSTRACT

A method of increasing a surface-enhanced Raman scattering (SERS) signal of a compound is provided. The method includes dissolving the compound in water to form a solution, adding a substrate at least partially coated with gold nanoparticles to the solution to form a mixture, removing the substrate from the mixture and washing with water to form a SERS sample having at least a portion of molecules of the compound adsorbed to the gold nanoparticles on the substrate, and recording a SERS spectrum of the SERS sample. The gold nanoparticles are in a two-dimensional (2D) monolayer assembly on the substrate and are 10-250 nm in size. The SERS signal of the SERS spectrum is higher than a SERS signal of a SERS spectrum of the compound on the substrate without the gold nanoparticles.

13 Claims, 23 Drawing Sheets

Related U.S. Application Data continuation of application No. 17/828,632, filed on May 31, 2022, now Pat. No. 11,754,502.

(56) References Cited

U.S. PATENT DOCUMENTS

| | | | |
|---|---|---|---|
| 11,754,502 B1 * | 9/2023 | Hossain | G01N 21/658 356/301 |
| 12,117,399 B2 * | 10/2024 | Hossain et al. | G01N 21/658 356/301 |
| 2017/0261434 A1 | 9/2017 | Gwo et al. | |

OTHER PUBLICATIONS

Tim, et al. ; Optimizing SERS performance through aggregation of gold nanorods in Langmuir-Blodgett films ; Applied Surface Science 573 ; Oct. 10, 2021 ; 9 Pages.

Lu, et al. ; Light-Controlled Shrinkage of Large-Area Gold Nanoparticle Monolayer Film for Tunable SERS Activity ; Chem. Mater. 30, 6 ; pp. 1989-1997 ; Mar. 7, 2018 ; Abstract Only ; 2 Pages.

Hossain et al., Nanoassembly of gold nanoparticles: An active substrate for size-dependent surface-enhanced Raman scattering, Aug. 2020, Spectrochimica Acta Part A: Molecular and Biomolecular Spectroscopy, pp. 1-9 (Year: 2020).

* cited by examiner

METHOD FOR FORMING SUBSTRATE WITH GOLD SURFACE

CROSS-REFERENCE TO RELATED APPLICATIONS

The present application is a Continuation of U.S. application Ser. No. 18/319,055, now allowed, having a filing date of May 17, 2023 which is a Continuation of U.S. application Ser. No. 17/828,632, now U.S. Pat. No. 11,754,502 having a filing date of May 31, 2022.

BACKGROUND

Technical Field

The present disclosure is directed towards a method to increase surface-enhanced Raman scattering signal, particularly the method to increase the surface-enhanced Raman scattering signal using a substrate coated with gold nanoparticles, more particularly the method to increase the surface-enhanced Raman scattering signal using the substrate coated with a two-dimensional monolayer assembly of gold nanoparticles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Metal nanoparticles (NPs), particularly noble metal NPs in a variety of shapes and combinations within a nanometric domain (1-1,000 nm) have been well-established as emerging candidates in a wide range of areas from medicine to catalysis. Exotic properties of NPs are known and have also been reported in surface-enhanced Raman scattering (SERS) [Hossain et al., Mater. Sci. Forum 754, 143-169, 2013; Hossain et al., Curr. Sci. 97, 192-201, 2009], and surface plasmon resonance (SPR) [Hossain et al., Curr. Sci. 97, 192-201, 2009]. Extensive progress has been achieved in the fabrication and functionalization of such NPs for applications in SPR-mediated single-molecule detection [Hossain et al., Curr. Sci. 97, 192-201, 2009].

Long-range two-dimensional (2D) nanoassemblies of NPs, possessing immense potential in various applications have also been reported. These nanoassemblies have properties, such as coupled plasmon assisted magnetic and optical properties [Dong et al., Nature 466, 474-477, 2010; Shi et al., ACS Photonics 6, 314-321, 2019; Ng et al., ACS Nano 6, 925-934, 2012; Si et al., ACS Nano 8, 11086-11093, 2014], enhanced mechanical strength [Cheng et al., Nat. Mater. 8, 519-525, 2009], highly unusual conductivity [Cargnello et al., Nature 524, 450-453, 2015], diverse and tunable optical properties [Chen et al., Chem. Soc. Rev. 42, 2679-2724, 2013] which differ from individual NPs.

Fabrication of hierarchical and functional nanoassemblies from individual NPs is a challenging process [Luo et al., Small 11, 5984-6008, 2015] due to the lack of capabilities in meticulous and minute control of nanoscale interactions, such as Vander Waals interactions [Schlicke et al., ACS Appl. Mater. Interfaces 7, 15123-15128, 2015], electrostatic interactions [Miszta et al., Nat. Mater. 10, 872-876, 2011], depletion interactions [Baranov et al., Nano Lett. 10, 743-749, 2010], and dipole-dipole interactions [Wang et al., Mater. Today 16, 110-116, 2013] that play an important role in the formation of nanoassemblies. The NPs are required to be functionalized or get templated to achieve well-defined nanoassemblies. Extensive studies have been carried out to understand the techniques, e.g., self-assembled monolayer (SAM), a well-known technique in fabricating well-defined nanoassemblies of colloidal NPs for molecule detections particularly in SERS measurements [Chen et al., Small 7, 2365-2371, 2011; Hossain et al., Appl. Phys. B: Lasers Opt. 93, 165-170, 2008]. However, surfactants or linkers are usually used in the SAM technique. The surfactants or linkers facilitate a mesh for immobilizing colloidal NPs that turns into a self-assembled monolayer. The surfactants or linkers cause unwanted background noise in SERS applications. In addition, the target analytes are also physically blocked by these molecules to be within the vicinity of induced electromagnetic (EM) field, also known as a hotsite.

Evaporation-assisted self-assembly or drop-casting is one of the most widely adopted strategies to achieve the long-range 2D nanoassemblies of NPs. However, due to complex kinetic and thermodynamic processes in the nanoscale such as NPs interactions, NPs convection, surface tension at the rim, heat transfer rate, etc., the strategy is mostly limited to micron and sub-micron size particles assembly.

US20170261434A1 discloses a SERS substrate with a ligand-regulated gold NPs superlattice film with a built-in internal standard. KR20170094926A discloses a patterned nanostructure that is manufactured by patterning a nanocomposite including plasmon gold NPs and hydrogel particles on a 2D substrate for SERS measurement. Tim et al. (Appl. Surf. Sci. 573, 151518, 2022) disclose a method to improve SERS performance through the aggregation of gold nanorods in Langmuir-Blodgett films. The method utilizes pegylated gold nanorods in the Langmuir-Blodgett films to improve the SERS performance for ultrasensitive detection of molecules, by tuning plasmonic coupling and NPs surface coverage.

Despite these recent advances in increasing the SERS signal by utilizing the nanostructured materials, the drawbacks of each of the aforementioned methods such as the use of linkers or surfactants, lack of long-ranged and well-defined 2D assembly, lack of simple and facile process, indicate that there is still a need for a novel, simple, and facile, method for increasing the SERS signal by utilizing the long-ranged and well-defined 2D nanoassembly of gold nanoparticles.

SUMMARY

In an exemplary embodiment, a method of increasing a surface-enhanced Raman scattering (SERS) signal of a compound is described. The method includes dissolving the compound in water to form a solution, adding a substrate at least partially coated with gold nanoparticles to the solution to form a mixture, removing the substrate from the mixture and washing with water to form a SERS sample having at least a portion of molecules of the compound adsorbed to the gold nanoparticles on the substrate, and recording a SERS spectrum of the SERS sample. The gold nanoparticles are in a two-dimensional (2D) monolayer assembly on the substrate and are 10-250 nm in size. Surface of the gold nanoparticles is not functionalized with an outer shell. The 2D monolayer assembly does not require a surfactant or linker. The SERS signal of the SERS spectrum is higher than a SERS signal of a SERS spectrum of the compound on the substrate without the gold nanoparticles.

In some embodiments, size of the gold nanoparticles in the 2D monolayer assembly varies by no more than 15 nm.

In some embodiments, each gold nanoparticle is adjacent to at least two other gold nanoparticles in the 2D monolayer assembly.

In some embodiments, each gold nanoparticle is adjacent to 6-8 other gold nanoparticles in the 2D monolayer assembly.

In some embodiments, the gold nanoparticles have an interparticle gap of 1-15 nm in the 2D monolayer assembly.

In some embodiments, the gold nanoparticles have an interparticle gap of 2-6 nm in the 2D monolayer assembly.

In some embodiments, the 2D monolayer assembly of gold nanoparticles is 1-100 μm in size.

In some embodiments, the 2D monolayer assembly of gold nanoparticles is 10-40 μm in size.

In some embodiments, the SERS signal is enhanced $10-10^8$ times that of the compound on the substrate without the gold nanoparticles.

In some embodiments, the substrate is glass.

In some embodiments, the compound is selected from a group consisting of a triphenylmethane derivative, a rhodamine derivative, a phthalimide derivative, and a phycoerythrin derivative.

In some embodiments, the compound is crystal violet.

In some embodiments, the 2D monolayer assembly of gold nanoparticles has a maximum absorption signal at 500-700 nm.

In some embodiments, the SERS sample is irradiated with 500-550 nm light to record the SERS spectrum.

In some embodiments, the gold nanoparticle 2D monolayer assembly on the substrate has an electromagnetic field intensity of 100-175 V/m.

In some embodiments, the 2D monolayer assembly of gold nanoparticles on the substrate is made by a method which includes mixing the gold nanoparticles in a solvent to form a dispersion, coating the dispersion onto a first substrate to form a film, placing a second substrate onto the film, evaporating the solvent to form the 2D monolayer assembly of gold nanoparticles. The dispersion is disposed between the first and second substrates and the substrates are spaced 0.1-2 mm apart.

In some embodiments, the substrates are spaced 1 mm apart.

In some embodiments, the solvent is selected from the group consisting of water, ethanol, methanol, and isopropanol.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
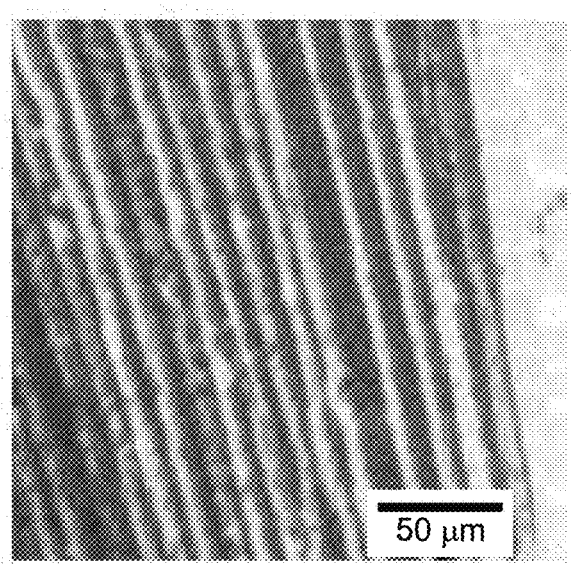
FIG. 1 shows an AFM micrograph of strip-like 2D monolayer assembly of gold nanoparticles.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the terms "substance", and "compound" are used interchangeably and are intended to refer to a chemical entity, whether in solid, liquid, or gaseous phase, and whether in a crude mixture or purified and isolated.

As used herein, the term "outer shell" refers to an outermost shell that substantially covers an underlying particle.

As used herein, the term "colloid" refers to particles suspended in a continuous medium having a nanometer-scale particle size.

As used herein, the term "assembly" refers to an ordered structure.

As used herein, the term "monolayer assembly" refers to an ordered structure comprising one layer.

As used herein, the terms "two-dimensional monolayer assembly", "2D monolayer assembly", "nanoassembly", and "NA" are used interchangeably and intended to refer to a two-dimensional ordered structure comprising a monolayer.

As used herein, the term "Raman scattering" refers to inelastic scattering of a photon incident on a molecule, more particularly, to a process that produces light of frequency other than the frequency of the incident light.

As used herein, the term "adsorbed" and grammatical variations thereof, refers to any kind of interactions between a substance and a substrate. The interaction of the substance to the substrate includes physical non-ionic interaction, ionic interaction, covalent binding, and any combination thereof. The physical non-ionic interaction is where the surface of the substrate has physical properties (e.g., hydrophobic areas) that bind to the substance via van der Walls forces, hydrogen bonds, or other strong non-ionic or non-covalent interactions. The ionic interaction is where the substance has a charge that interacts with an opposite charge on the surface of the substrate. The covalent binding is where a chemical reaction forms a covalent bond between the substance and the substrate.

As used herein, the term "in close proximity" refers to within about 100 nm or less, preferably about 50 nm or less.

As used herein, the term "Surface-enhanced Raman scattering" or "SERS" refers to a phenomenon that occurs when a Raman scattering signal, or intensity, is enhanced when a Raman-active molecule is adsorbed on or in close proximity to a metal surface.

As used herein, the terms "nanoparticle" and "NP" are used interchangeably and are intended to refer to a particle having at least one dimension in the range of about 1 nm to about 1000 nm.

As used herein, the terms "gold nanoparticle", "Au—NP", and "Au NP" are used interchangeably and are intended to refer to an elemental gold-rich particle having at least one dimension in the range of about 1 nm to about 1000 nm. The gold nanoparticle comprises greater than 50%, more preferably greater than 60%, more preferably greater than 70%, more preferably greater than 75%, more preferably greater than 80%, more preferably greater than 85%, more preferably greater than 90%, more preferably greater than 95%, most preferably greater than 99% of elemental gold by weight.

As used herein, the terms "Au-NA," "Au NA," "Au—NS", and "Au NS" are used interchangeably and are intended to refer to two-dimensional monolayer assemblies of gold nanoparticles.

As used herein, the term "substrate" refers to a single or multi-dimensional, natural or synthetic material or substance capable of supporting two-dimensional monolayer assemblies.

As used herein, the term "hotsite" refers to a vicinity of an induced electromagnetic field in interparticle gaps (also termed as "interstitials").

In an embodiment, the invention relates to a method of increasing a surface-enhanced Raman scattering (SERS) signal of a compound. The order in which the method is described is not intended to be construed as a limitation, and any number of the described method steps may be combined in any order to implement the method. Additionally, individual steps may be removed or skipped from the method without departing from the spirit and scope of the present disclosure.

In an embodiment, the method comprises dissolving the compound in water to form a solution. In some embodiments, the water is deionized water. In some embodiments, the compound has a concentration of 1 nanomolar (nM) to 1 millimolar (mM), preferably 100 nM to 100 µM, or approximately 1 µM, in the solution. In an embodiment, the compound is selected from a group including a triphenylmethane derivative, a rhodamine derivative, a phthalimide derivative, and a phycoerythrin derivative. In an exemplary embodiment, the compound is crystal violet (CV).

In an embodiment, the method further comprises adding a substrate at least partially coated with gold nanoparticles to the solution to form a mixture. In some embodiments, at least 20% of the substrate surface is coated with gold nanoparticles, preferably 30%, 40%, 50%, 60%, 70%, 80%, 90%, or 100%. In some embodiments, a first and a second side of the substrate are coated with the gold nanoparticles. In an embodiment, only a first side of the substrate is coated with the gold nanoparticles. In an embodiment, the substrate is any material suitable for a Raman scattering experiment. In an embodiment, the substrate is glass. In an exemplary embodiment, the substrate is a microscopic glass slide.

In an embodiment, the gold nanoparticles are in a two dimensional (2D) monolayer assembly on the substrate. In an embodiment, the size of the gold nanoparticles ranges from about 5 nm to about 300 nm, preferably from about 10 nm to about 250 nm, 50-200 nm, or 100-150 nm. In an exemplary embodiment, size of the gold nanoparticles is about 20 nm. In another exemplary embodiment, size of the gold nanoparticles is about 50 nm. In yet another exemplary embodiment, size of the gold nanoparticles is about 80 nm. In yet another exemplary embodiment, size of the gold nanoparticles is about 100 nm. In yet another exemplary embodiment, size of the gold nanoparticles is about 150 nm. In yet another exemplary embodiment, size of the gold nanoparticles is about 200 nm. In an embodiment, size of the gold nanoparticles in the 2D monolayer assembly varies by no more than 20 nm, preferably varies by no more than 15 nm, 10 nm, or 5 nm. In an exemplary embodiment, the size of the gold nanoparticles in the 2D monolayer assembly varies by no more than 10 nm.

In some embodiments, the gold nanoparticles are substantially spherical in shape. In some embodiments, a portion of the nanoparticles, preferably less than 30%, 20%, 10%, or less than 5%, are not spherical and have an irregular shape. In an embodiment, a surface of the nanoparticles is smooth. In some embodiments, a portion of the surface of the nanoparticles is rough and contains defects, preferably 0-30%, or 10-20%. In an embodiment, the gold nanoparticles have a cubic crystal system, a hexagonal crystal system, a triclinic crystal system, a monoclinic crystal system, or a tetragonal crystal system. In an embodiment, the gold nanoparticles have a cubic crystal system. In an embodiment, the gold nanoparticles have a face-centered cubic crystal system, a primitive cubic crystal system, or a body-centered cubic system. In a preferred embodiment, the gold nanoparticles have a face-centered cubic system.

In an embodiment, each gold nanoparticle is adjacent to at least two other gold nanoparticles in the 2D monolayer assembly, preferably 2-10, 4-8, or approximately 6. In another embodiment, each gold nanoparticle is adjacent to 6-8 other gold nanoparticles in the 2D monolayer assembly. In an exemplary embodiment, each gold nanoparticle is adjacent to six other gold nanoparticles in the 2D monolayer assembly.

In another embodiment, the gold nanoparticles in the 2D monolayer assembly have the interparticle gap of not more than about 20 nm, preferably not more than about 15 nm. In yet another embodiment, the gold nanoparticles have the interparticle gap ranging from about 1 nm to about 15 nm in the 2D monolayer assembly, preferably 2-14 nm, 3-13 nm, 4-12 nm, 5-11 nm, 6-10 nm, 7-9 nm, or approximately 8 nm. In yet another embodiment, the gold nanoparticles have the interparticle gap of 2-6 nm in the 2D monolayer assembly, preferably 3-5 nm or approximately 4 nm. In another exemplary embodiment, the gold nanoparticles in the 2D monolayer assembly have the interparticle gap of not more than about 5 nm.

In an embodiment, the size of the 2D monolayer assembly of gold nanoparticles ranges from about 0.5 µm to about 150 µm, preferably from about 1 µm to about 100 µm, 10 µm to 90 µm, 20 µm to 80 µm, 30 µm to 70 µm, 40 µm to 60 µm, or approximately 50 µm. In another embodiment, the 2D monolayer assembly of gold nanoparticles is 10-40 µm in size.

In yet another embodiment, the surface of the gold nanoparticles is not functionalized with an outer shell. In other words, the gold nanoparticles are substantially comprised of gold and do not have an outer shell of a material other than gold or a capping agent on the surface. In some embodiments, a capping agent is used to reduce the surface charge of the gold nanoparticles from $Au^{3+}$ to Au. In an embodiment, the capping agent is present to inhibit the over-growth of nanoparticles and prevent their aggregation/coagulation in colloidal synthesis. In an embodiment, the capping agent does not assist in the formation of the 2D monolayer. In an embodiment, functionalization of the outer surface of the gold nanoparticles is not employed to assist in the formation of the 2D monolayer. In yet another embodiment, the 2D monolayer assembly does not require a surfactant or a linker. Surfactants, linkers, and outer shell functionalization of nanoparticles are methods commonly used in order to achieve ordered structures, such as that described in the background section of this disclosure. In an embodiment, the method of synthesis of the current disclosure achieves long range order without the need for additional components. In an embodiment, the use of additional components can alter or inhibit SERS signal and increase the complexity of the synthetic method.

In an embodiment, a method of making the 2D monolayer assembly of gold nanoparticles is described. The order in which the method is described is not intended to be construed as a limitation, and any number of the described method steps may be combined in any order to implement the method. Additionally, individual steps may be removed or skipped from the method without departing from the spirit and scope of the present disclosure.

In an embodiment, the 2D monolayer assembly of gold nanoparticles on the substrate is made by a method including mixing the gold nanoparticles in a solvent to form a dispersion. In an embodiment, the solvent is selected from the group including water, ethanol, methanol, and isopropanol. In an embodiment, the solvent is water. The method further includes at least partially coating the dispersion onto a first substrate to form a film. In some embodiments, at least 20% of the first substrate surface is coated with the dispersion, preferably 30%, 40%, 50%, 60%, 70%, 80%, 90%, or 100%. In an embodiment, the coating can be done by any method known in the art including but not limited to, drop casting, or spin coating.

The method further includes placing a second substrate onto the film. In an embodiment, the first and second substrate are the same size, and the second substrate is placed directly on top of the first as to cover the entire surface. In an embodiment, the second substrate is smaller than the first substrate and only partially covers the area with the dispersion. In an embodiment, the second substrate is larger than the first substrate so as to cover the entire surface and have excess area around the edges. In yet another embodiment, the dispersion is disposed between the first and second substrates and the substrates are spaced 0.1-2 mm, preferably 0.3-1.7 mm, 0.5-1.5 mm, or 0.8-1.2 mm apart. In an exemplary embodiment, the substrates are spaced 1 mm apart. The method further includes evaporating the solvent to form the 2D monolayer assembly of gold nanoparticles. In a preferred embodiment, the second substrate is slowly removed from the first substrate and dispersion as the solvent evaporates. In an embodiment, the second substrate is slowly removed vertically from the first substrate and dispersion as the solvent evaporates. In an embodiment, the second substrate is slowly removed horizontally from the first substrate and dispersion as the solvent evaporates. In an embodiment, the second substrate is removed at a rate of 0.1-1 mm per minute, preferably 0.2-0.9 mm/min, 0.3-0.8 mm/min, 0.4-0.7 mm/min, or 0.5-0.6 mm/min. In an embodiment, the solvent is evaporated at a temperature of 25-100° C., preferably 30-90° C., 40-80° C., 50-70, or approximately 60° C. to form the 2D monolayer assembly of gold nanoparticles. In a preferred embodiment, the method further includes assisting the evaporation of the solvent by irradiating the substrates and dispersion with infrared light. In an embodiment, the infrared light has a wavelength of 700-1,500 nm. In an embodiment, the infrared light has a power of 100-300 watts, preferably 150-250 watts or approximately 200 watts. In an embodiment, the infrared light is uniformly shined on the substrates and dispersion.

In an embodiment, the 2D monolayer assembly is formed without any surfactants or linkers because of the adhesion forces of the dispersion between the two substrates. Secondary vortexes near the meniscus supported by primary vortexes which facilitate a continuous supply of constituent nanoparticles in the secondary vortex near the meniscus allow for the formation of the 2D monolayer assembly (FIGS. 31-35).

In an embodiment, following adding the substrate at least partially coated with gold nanoparticles to the solution to form the mixture, the method further includes removing the substrate from the mixture and washing with water to form a SERS sample having at least a portion of molecules of the compound adsorbed to the gold nanoparticles on the substrate. In an embodiment, the washing removes any compound not adsorbed to the gold nanoparticles. In an embodiment, less than 50 ppm of compound is left on the substrate that is not adsorbed to a gold nanoparticle. In some embodiments, at least one molecule of the compound is adsorbed to at least one gold nanoparticle. In some embodiments, at least 10% of the gold nanoparticles have at least one molecule adsorbed, preferably 20%, 30%, 40%, 50%, 60%, 70%, 80%, 90%, or 100%. In an embodiment, at least 10% of the gold nanoparticle surface has a molecule adsorbed, preferably 20%, 30%, 40%, 50%, 60%, 70%, 80%, 90%, or 100%.

In an embodiment, the method further includes recording a SERS spectrum of the SERS sample. In an embodiment, the SERS spectrum is recorded with a Raman spectrometer. In Raman spectroscopy, the sample is illuminated with light, and a small portion of the photons will scatter at a different frequency than the incident light, called the Raman effect. These different frequency photons can give insight to vibrational energy modes of a sample, however due to the small portion of Raman scattering, the signal is inherently low. In SERS, the sample is typically on a solid substrate in combination with noble metal particles. These noble metal particles help to enhance the SERS signal by absorbing light and generating a localized electromagnetic (EM) field. Therefore, creating a noble metal substrate that generates a large EM field is important to achieving high signals.

In an embodiment, the 2D monolayer assembly of gold nanoparticles has a maximum absorption signal between 500 and 700 nm, preferably 525-675 nm, 550-650 nm, 575-625 nm, or approximately 600 nm. In an exemplary embodiment, the 2D monolayer assembly of gold nanoparticles has two absorption maximum bands at about 560 nm and at about 670 nm. In an embodiment, the SERS sample is irradiated with 500-550 nm, preferably 510-540, or 520-530 nm light to record the SERS spectrum. In an exemplary embodiment, the SERS sample is irradiated with 514.5 nm light to record the SERS spectrum. In an embodiment, the SERS signal of the SERS spectrum is higher than a SERS signal of a SERS spectrum of the compound on the substrate without the gold nanoparticles in the 2D monolayer assembly. In another embodiment, the SERS signal is enhanced $10-10^8$ times, preferably $10^2-10^7$, $10^3-10^6$, or $10^4-10^5$ that of the compound on the substrate without the 2D monolayer assembly of gold nanoparticles.

For a large enhancement in SERS, it is important to facilitate the hotsites to be sites for strong localized EM-field. For closely interconnected nanoparticles, the hotsites, are to be very close, but not physically in touch. In an embodiment, the 2D monolayer assembly of gold nanoparticles are simulated by finite difference time domain (FDTD) analysis to determine EM near-field distributions. In an embodiment, the gold nanoparticle 2D monolayer assembly on the substrate has an electromagnetic field intensity of 100-175 V/m, preferably 110-160 V/m, 120-150 V/m, or 130-140 V/m. In another embodiment, the 2D monolayer assembly, wherein each gold nanoparticle is adjacent to at least two other gold nanoparticles in the 2D monolayer assembly on the substrate has an electromagnetic field intensity of 100-175 V/m. In another embodiment, the 2D monolayer assembly, wherein each gold nanoparticle is adjacent to six other gold nanoparticles in the 2D monolayer assembly on the substrate has an electromagnetic field intensity of 100-175 V/m.

EXAMPLES

The foregoing general description of the illustrative present disclosure and the following detailed description thereof are merely exemplary aspects of the teachings of this disclosure and are not restrictive.

Example 1: Preparation of the 2D Monolayer Assemblies of Gold Nanoparticles

The 2D monolayer assemblies of gold nanoparticles of about 20 nm, 50 nm, 80 nm, 100 nm, 150 nm, and 200 nm diameter were prepared at room temperature under the atmospheric condition without using any additional surfactant, linker, or capping agent. The double slide method of the invention was used to prepare the 2D monolayer assemblies of gold nanoparticles. An aliquot of gold nanoparticles colloid (BBInternational, Cardiff, UK) ranging from about 200 μL to about 400 μL was dropped on pre-cleaned substrates (microscopic glass slides of 76×26×(0.8–1.0) mm dimension, MATSUNAMI) and sandwiched in between two such glass substrates with about 1 mm spacer. Afterward, a controlled evaporation-assisted strategy was adopted to evaporate the sandwiched droplets to prepare the 2D monolayer assembly of gold nanoparticles. The 2D monolayer assembly of gold nanoparticles was observed to be available on both of the glass substrates.

Referring now to FIG. 1, which shows an AFM micrograph of strip-like 2D monolayer assembly of gold nanoparticles. The figure indicates irregular strips of the 2D monolayer assembly of gold nanoparticles.

Figure 2:
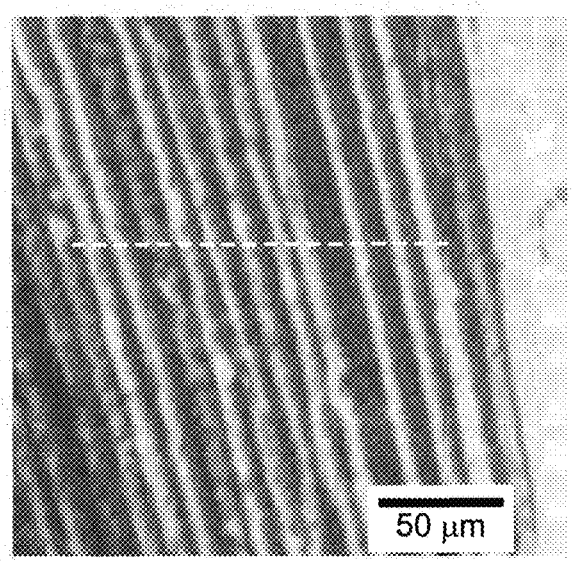
FIG. 2 shows a line profile of strips of strip-like 2D monolayer assembly of gold nanoparticles.
Figure 2:
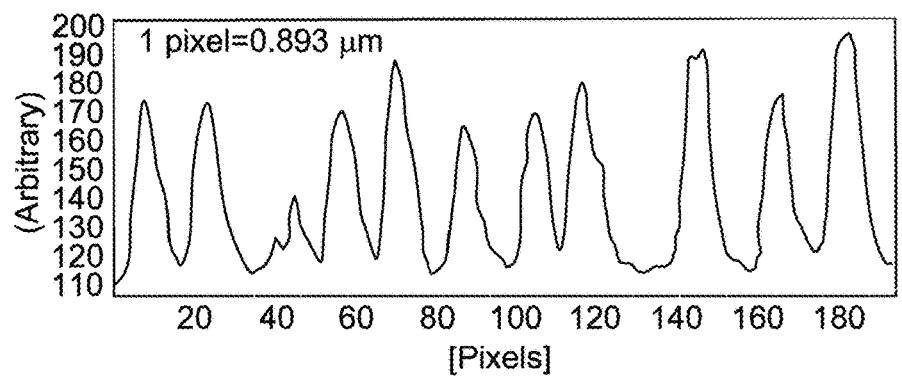

Referring now to FIG. 2, which shows a line profile of the strips of the strip-like 2D monolayer assembly of gold nanoparticles. The line profile of a white dotted line crossing 11 different size strips of the strip-like 2D monolayer assembly of gold nanoparticles is shown in the FIG. 2.

Figure 3:
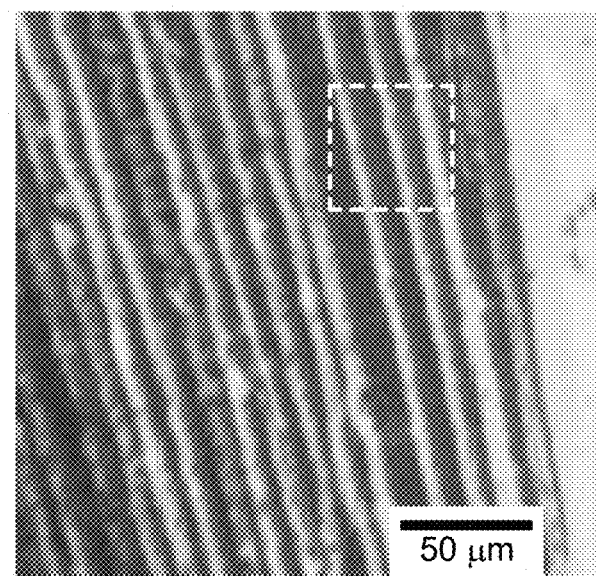
FIG. 3 shows a zoom-in view of three strips of strip-like 2D monolayer assembly of gold nanoparticles.
Figure 3:
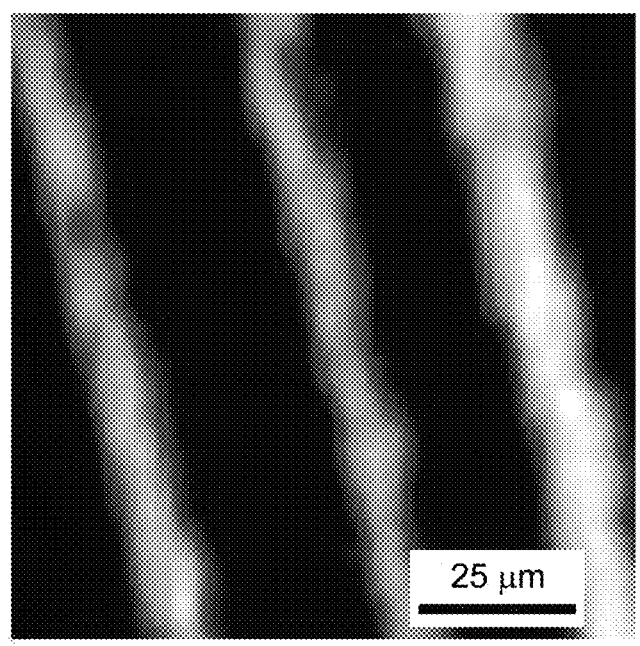

Referring now to FIG. 3, which shows a zoom-in view of three strips of the strip-like 2D monolayer assembly of gold nanoparticles. The zoom-in view of the three strips marked by a white dashed square therein is visible in the FIG. 3.

Figure 4:
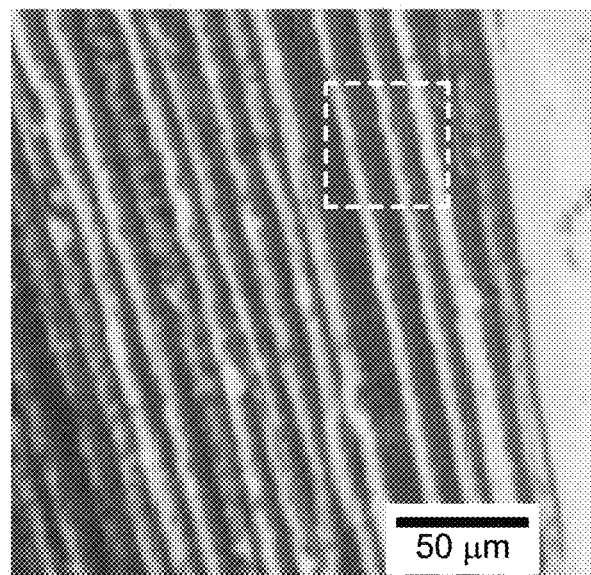
FIG. 4 shows a 3D hawk-eye view of three strips of strip-like 2D monolayer assembly of gold nanoparticles.
Figure 4:
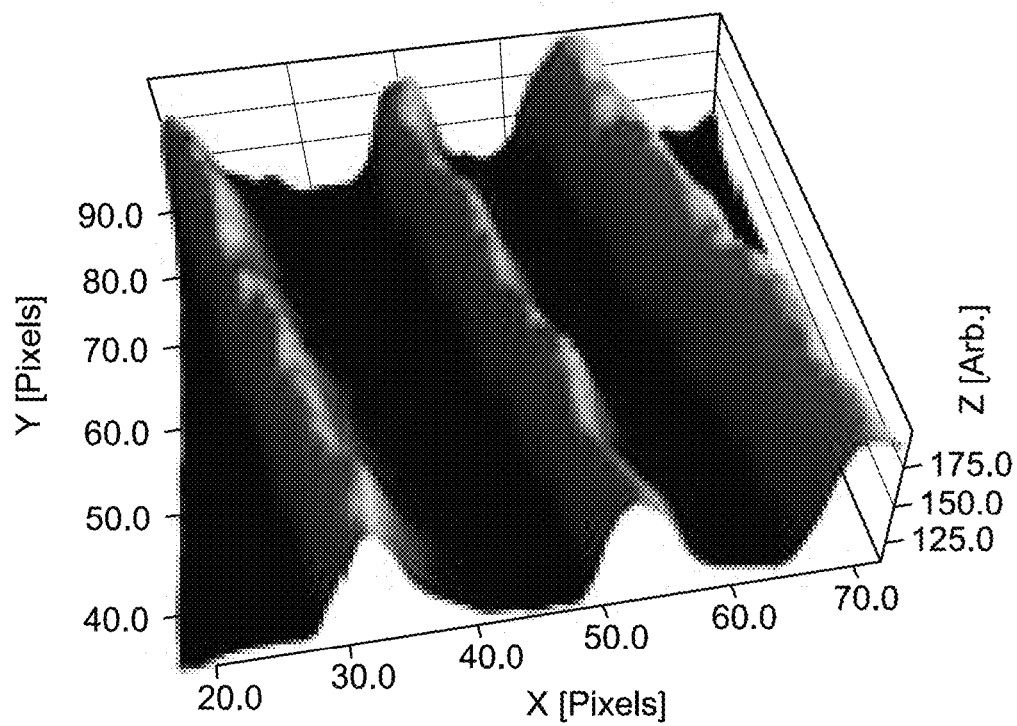

Referring now to FIG. 4, which shows a three-dimensional (3D) hawk-eye view of the three strips of the strip-like 2D monolayer assembly of gold nanoparticles. The 3D hawk-eye view of the three strips as marked by a white dashed square is visible in the FIG. 4.

Example 2: Analysis of Surface Topography of the 2D Monolayer Assemblies of Gold Nanoparticles The surface topography of the 2D monolayer assemblies of gold nanoparticles was analyzed by atomic force microscope (AFM) (Dimension 3000™) and scanning electron microscope (SEM) (JEOL JSM-6500F) before and after the SERS measurements.

Figure 5:
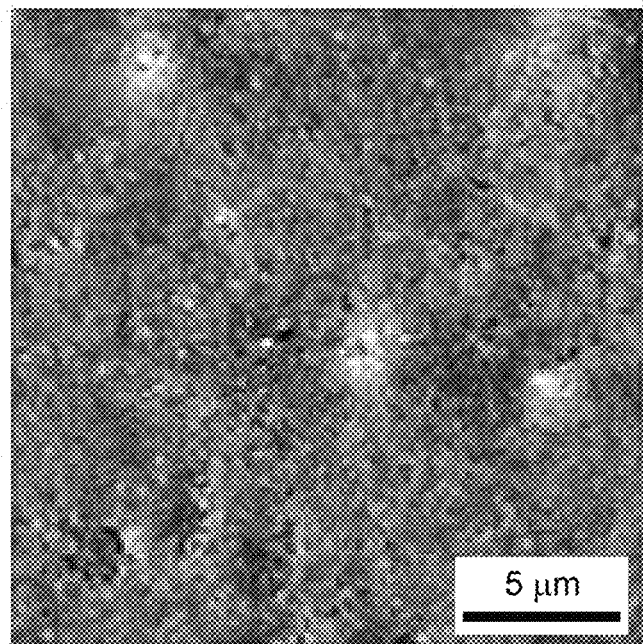
FIG. 5 shows a low-resolution AFM micrograph of 2D monolayer assembly of gold nanoparticles of about 80 nm diameter.

Referring now to FIG. 5, which shows a low-resolution AFM micrograph of the 2D monolayer assembly of gold nanoparticles of about 80 nm diameter. The low-resolution AFM micrograph revealed that the nanoassembly was quite wider (i.e., long-range) and well-defined.

Figure 6:
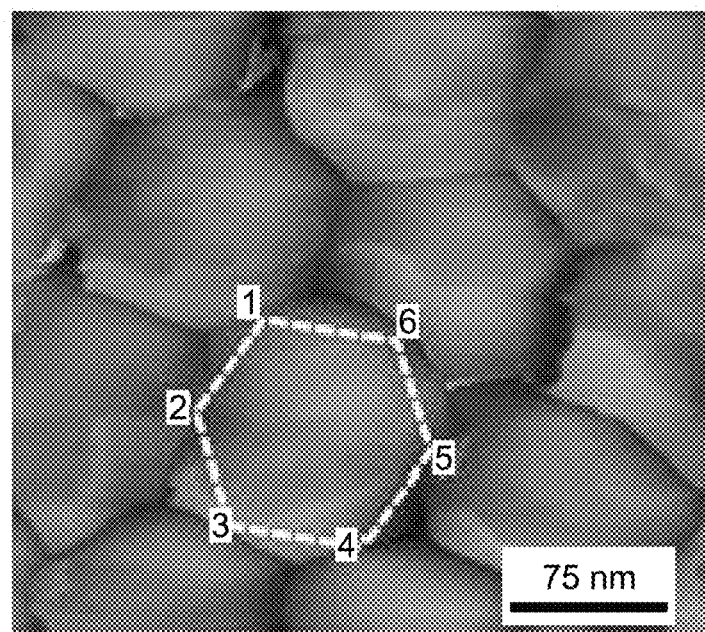
FIG. 6 shows a high-resolution AFM micrograph of 2D monolayer assembly of gold nanoparticles of about 80 nm diameter.

Referring now to FIG. 6, which shows a high-resolution AFM micrograph of the 2D monolayer assembly of gold nanoparticles of about 80 nm diameter. The high-resolution AFM micrograph revealed that the nanoassembly was well-ordered and, one nanoparticle was found to be surrounded by another six nanoparticles.

Figure 7:
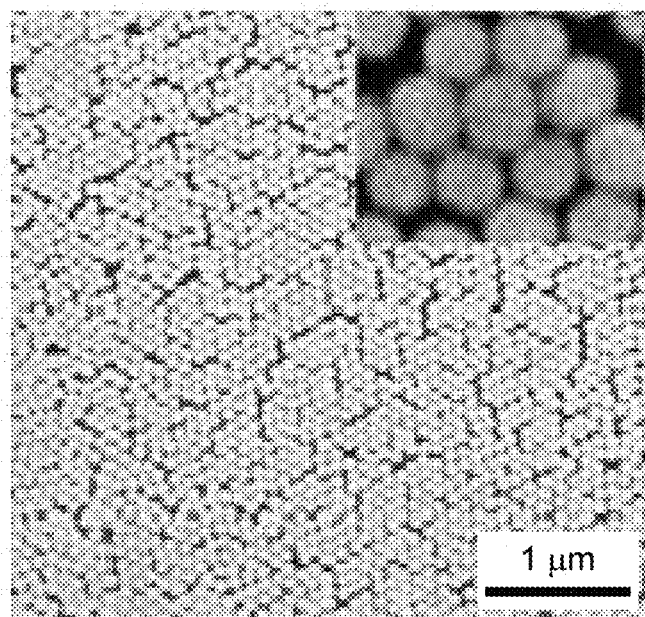
FIG. 7 shows a low-resolution SEM micrograph of 2D monolayer assembly of gold nanoparticles of about 80 nm diameter.

Referring now to FIG. 7, which shows a low-resolution SEM micrograph of the 2D monolayer assembly of gold nanoparticles of about 80 nm diameter. The constituent nanoparticles in the nanoassembly were observed to be separated by small interparticle gaps (also termed as "interstitials").

Figure 8:
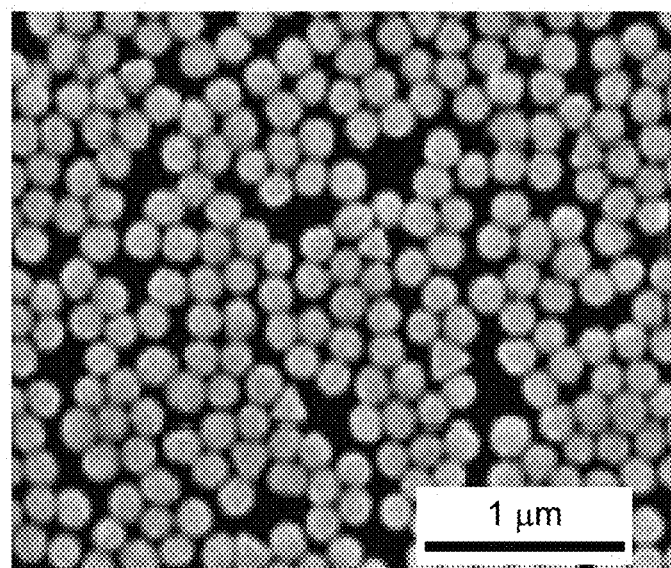
FIG. 8 shows a high-resolution SEM micrograph of 2D monolayer assembly of gold nanoparticles of about 80 nm diameter.

Referring now to FIG. 8, which shows a high-resolution SEM micrograph of the 2D monolayer assembly of gold nanoparticles of about 80 nm diameter. The high-resolution SEM micrograph revealed that the nanoassembly possessed compact and small interparticle gaps. An inset of the high-resolution SEM image of the nanoassembly in FIG. 7 indicated an interparticle gap of about 5 nm.

Due to the presence of artifacts in the AFM technique, the AFM micrographs (FIGS. 5 & 6) did not show interstitials, but individual nanoparticle in the nanoassembly was found to be separated from adjacent one in the SEM micrographs (FIGS. 7 & 8). The individual nanoparticle possessed six interstitials at vertices of a hexagon as marked by 1, 2, 3, 4, 5, and 6 in FIG. 6.

Figure 9:
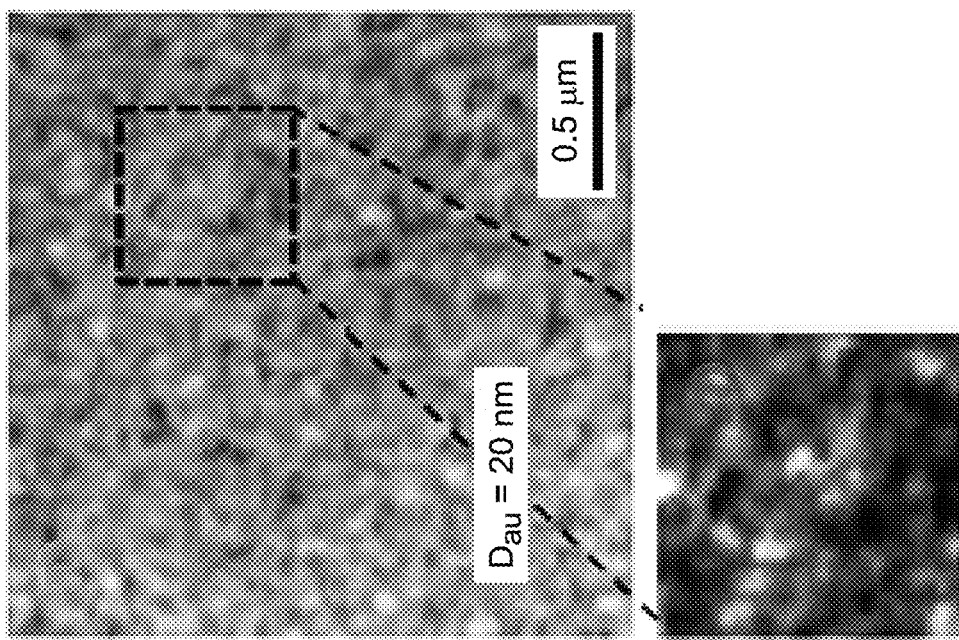
FIG. 9 shows an AFM micrograph of 2D monolayer assembly of gold nanoparticles of 20 nm diameter.

Referring now to FIG. 9, which shows an AFM micrograph of the constituent nanoparticles of the 2D monolayer assembly of gold nanoparticles of about 20 nm diameter. Because of the inherent artifact of the AFM technique, the AFM micrograph of the constituent nanoparticles of the nanoassembly was not clear enough. A magnified portion of the AFM micrograph, 500×500 nm$^2$ area, was zoomed in for a further close look as marked by a dashed square and shown in the inset. The arrangement of the constituent nanoparticles was not detectable, although some voids were visible within the area.

Figure 10:
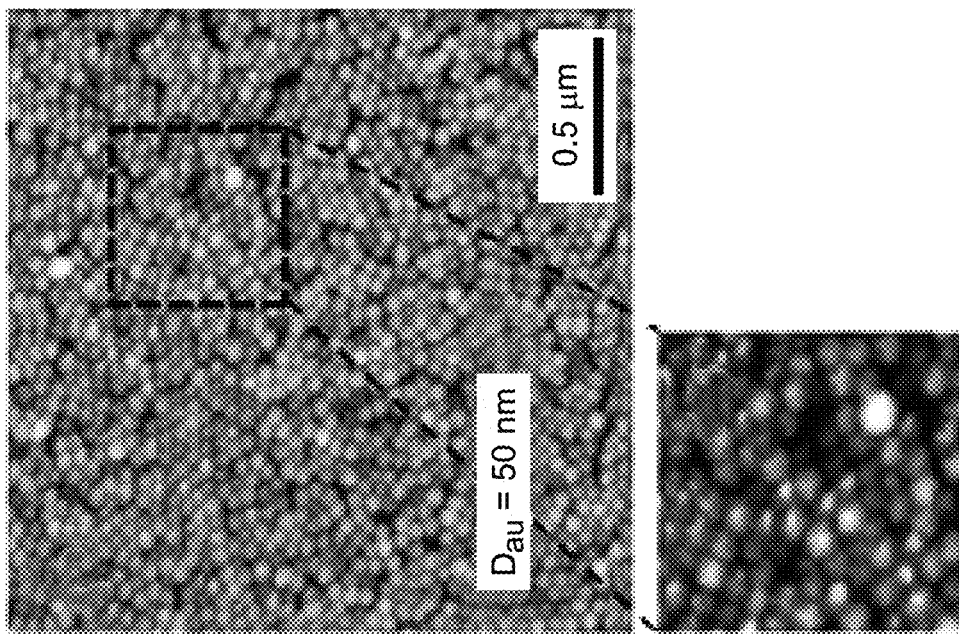
FIG. 10 shows an AFM micrograph of 2D monolayer assembly of gold nanoparticles of 50 nm diameter.

Referring now to FIG. 10, which shows an AFM micrograph of the constituent nanoparticles of the 2D monolayer assembly of gold nanoparticles of about 50 nm diameter. A clear and well-defined arrangement of the constituent nanoparticles of the nanoassembly was observed. A magnified portion of the AFM micrograph, 500×500 nm$^2$ area, was zoomed in for a further close look as marked by a dashed square and shown in the inset, which revealed that the constituent nanoparticles were assembled as monolayer and close-packed.

Figure 11:
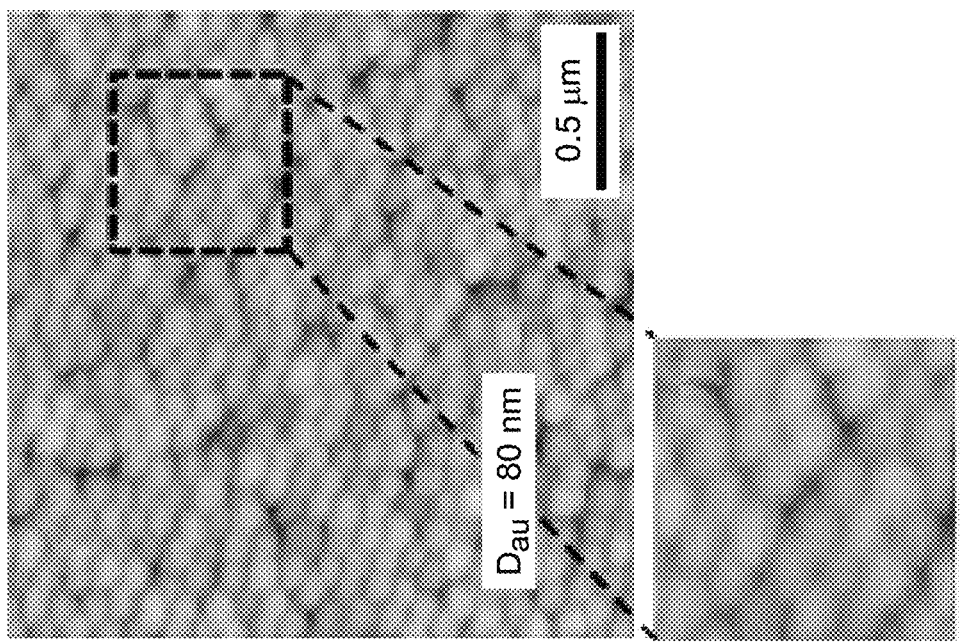
FIG. 11 shows an AFM micrograph of 2D monolayer assembly of gold nanoparticles of 80 nm diameter.

Referring now to FIG. 11, which shows an AFM micrograph of the constituent nanoparticles of the 2D monolayer assembly of gold nanoparticles of about 80 nm diameter. A clear and well-defined arrangement of the constituent nanoparticles of the nanoassembly was observed. A magnified portion of the AFM micrograph, 500×500 nm$^2$ area, was zoomed in for a further close look as marked by a dashed square and shown in the inset, which revealed that the constituent nanoparticles were assembled as monolayer and close-packed.

Figure 12:
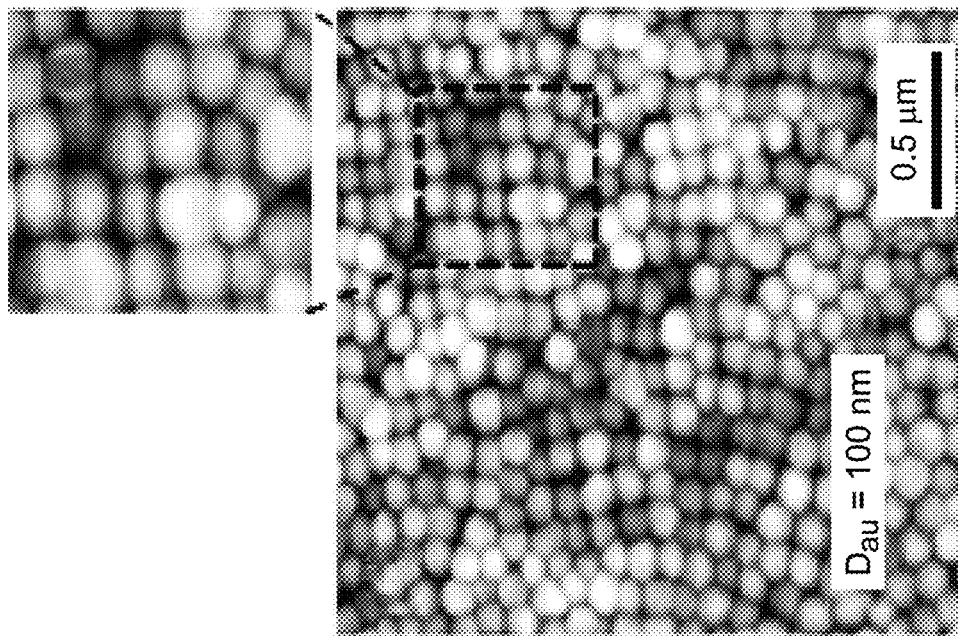
FIG. 12 shows an AFM micrograph of 2D monolayer assembly of gold nanoparticles of 100 nm diameter.

Referring now to FIG. 12, which shows an AFM micrograph of the constituent nanoparticles of the 2D monolayer assembly of gold nanoparticles of about 100 nm diameter. A clear and well-defined arrangement of the constituent nanoparticles of the nanoassembly was observed. A magnified portion of the AFM micrograph, 500×500 nm$^2$ area, was zoomed in for a further close look as marked by a dashed square and shown in the inset, which revealed that the constituent nanoparticles were assembled as monolayer and close-packed.

Figure 13:
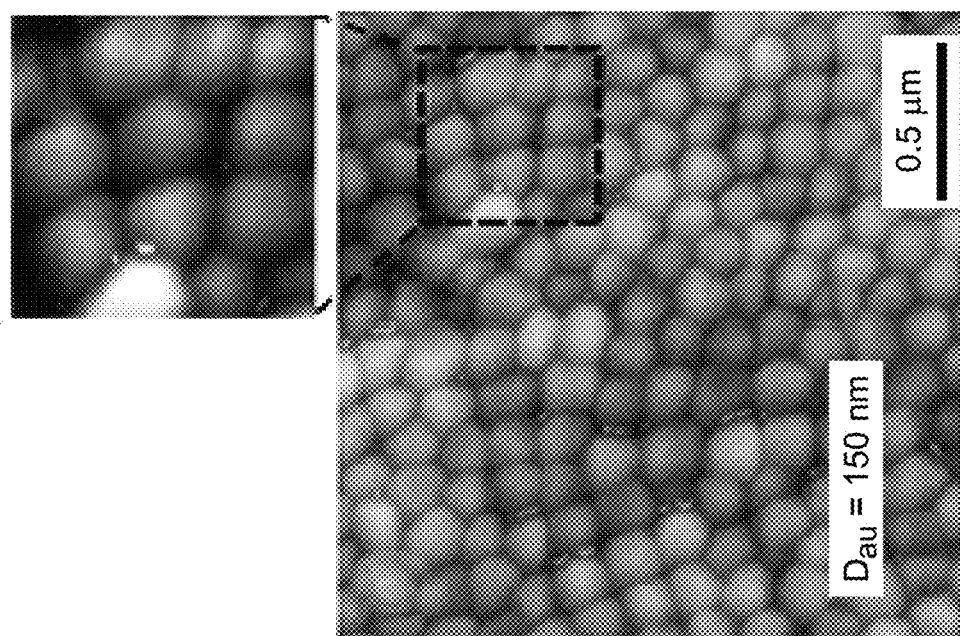
FIG. 13 shows an AFM micrograph of 2D monolayer assembly of gold nanoparticles of 150 nm diameter.

Referring now to FIG. 13, which shows an AFM micrograph of the constituent nanoparticles of the 2D monolayer assembly of gold nanoparticles of about 150 nm diameter. A clear and well-defined arrangement of the constituent nanoparticles of the nanoassembly was observed. A magnified portion of the AFM micrograph, 500×500 nm$^2$ area, was zoomed in for a further close look as marked by a dashed square and shown in the inset, which revealed that the constituent nanoparticles were assembled as monolayer and close-packed.

Figure 14:
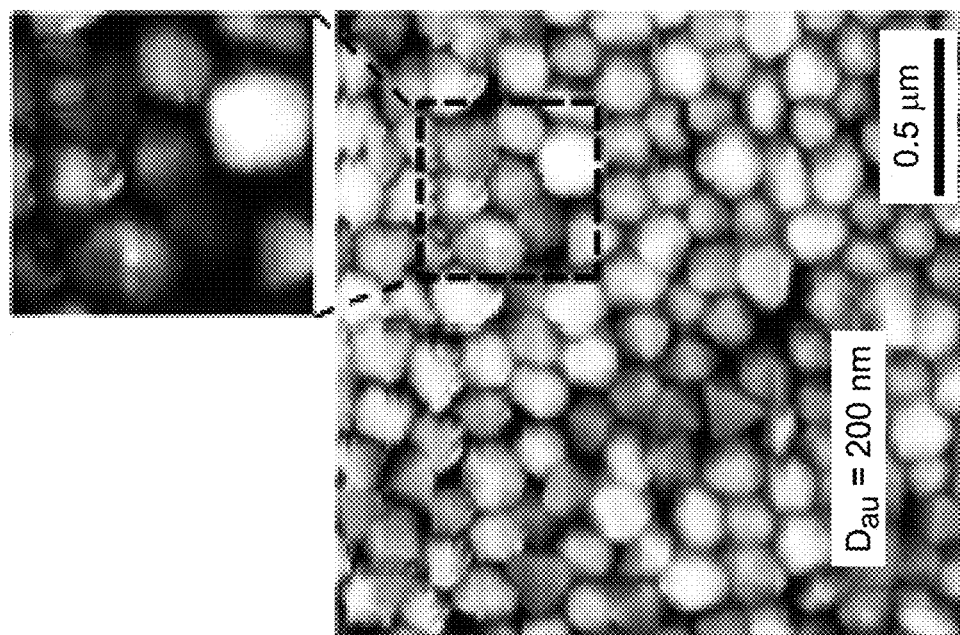
FIG. 14 shows an AFM micrograph of 2D monolayer assembly of gold nanoparticles of 200 nm diameter.

Referring now to FIG. 14, which shows an AFM micrograph of the constituent nanoparticles of the 2D monolayer assembly of gold nanoparticles of about 200 nm diameter. A clear and well-defined arrangement of the constituent nanoparticles of the nanoassembly was observed. A magnified portion of the AFM micrograph, 500×500 nm$^2$ area, was zoomed in for a further close look as marked by a dashed square and shown in the inset, which revealed that the constituent nanoparticles were assembled as monolayer and close-packed.

The AFM micrographs (FIG. 9 to FIG. 14) revealed that the 2D monolayer assemblies of gold nanoparticles of 20 nm, 50 nm, 80 nm, 100 nm, 150 nm, and 200 nm diameter were quite well-ordered and long-range.

Example 3: Analysis of Interparticle Gap Distribution and Size Distribution of Constituent Nanoparticles in the 2D Monolayer Assembly of Gold Nanoparticles Since characteristics of interstitials, particularly interparticle gap distribution and size distribution of the constituent nanoparticles, play a pivotal role in the enhancement of the SERS signals, therefore the high-resolution SEM micrograph of the 2D monolayer assembly of gold nanoparticles was analyzed for size distribution and interparticle gap distribution of constituent nanoparticles. Based on more than 350 events as observed in the high-resolution SEM micrograph of the 2D monolayer assembly of gold nanoparticles (FIG. 8), histograms were prepared to understand the size distribution and interparticle gap distribution of the constituent nanoparticles, and fitted with a Gaussian fit.

Figure 15:
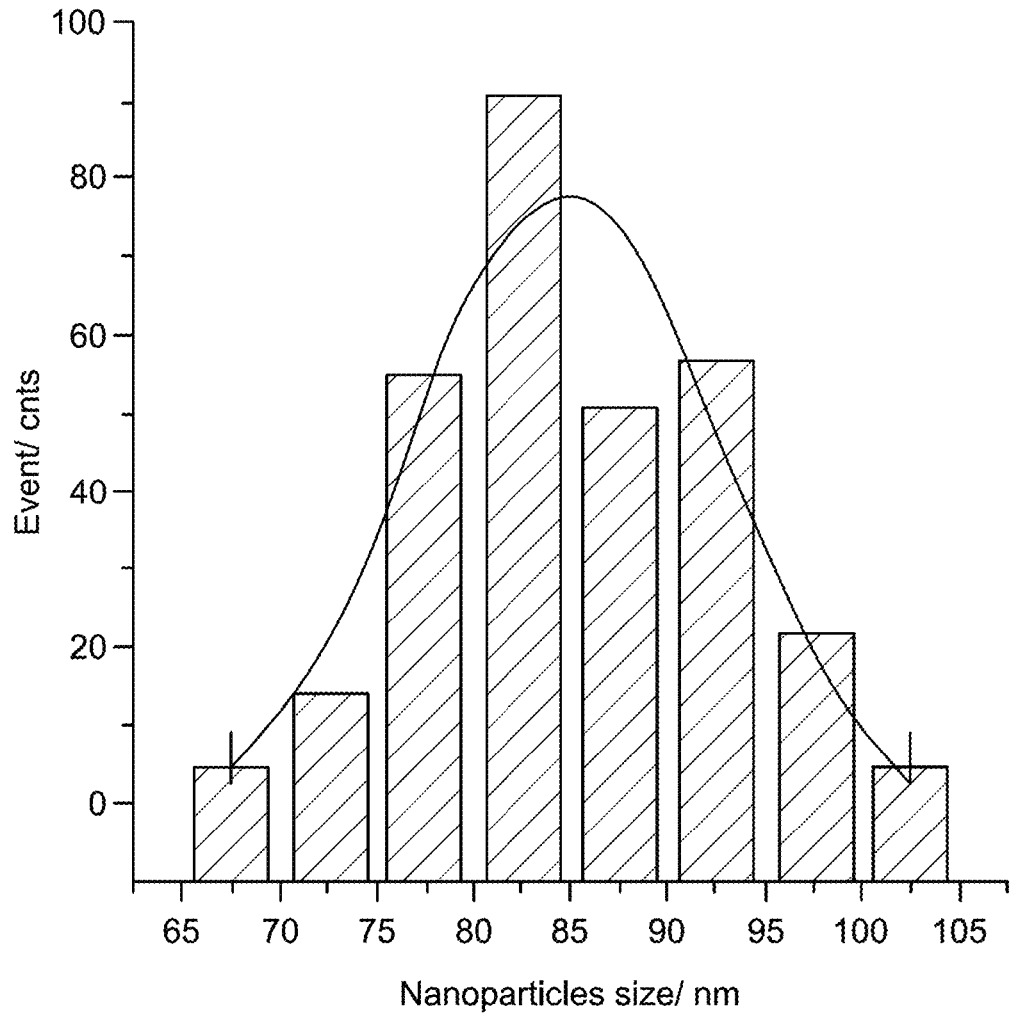
FIG. 15 illustrates a histogram of constituent nanoparticle's size distribution of gold nanoparticles of 80 nm diameter.

Referring now to FIG. 15, which illustrates the histogram of the constituent nanoparticle's size distribution along with a Gaussian fit. The histogram of the constituent nanoparticle's size distribution revealed a narrow size distribution with an average diameter of about 84.57±8.39 nm.

Figure 16:
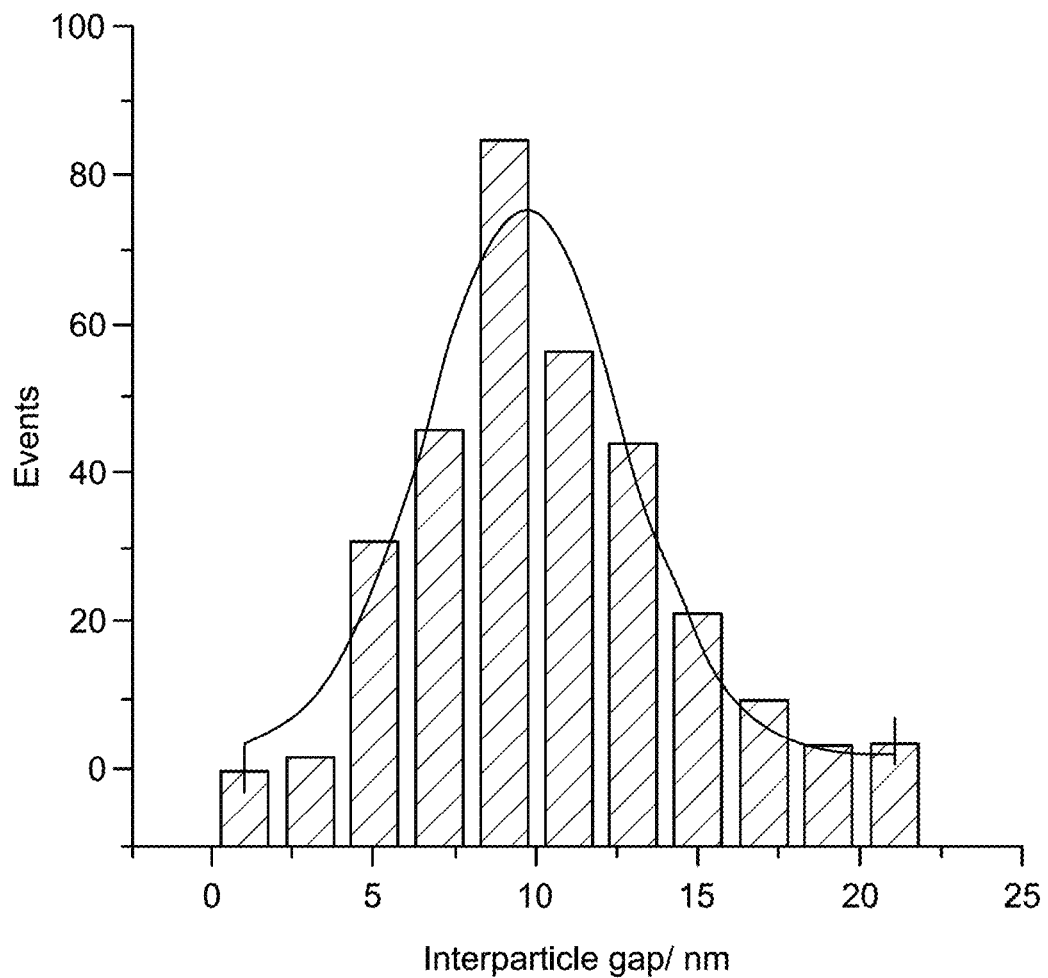
FIG. 16 illustrates a histogram of constituent nanoparticle's interparticle gap distribution of 2D monolayer assembly of gold nanoparticles of 80 nm diameter.

Referring now to FIG. 16, which illustrates the histogram of the constituent nanoparticle's interparticle gap distribution along with a Gaussian fit. The histogram of the constituent nanoparticle's interparticle gap distribution revealed a small interparticle gap distribution with an average interparticle gap of about 9.60±3.06 nm. The small interparticle gap distribution was considered to be responsible for achieving the high SERS signal enhancements.

Example 4: Ultraviolet-Visible (UV-Vis) Absorption Analysis of the 2D Monolayer Assembly of Gold Nanoparticles Absorption measurements were carried out for colloidal samples and the 2D monolayer assembly of gold nanoparticles using a UV-Vis absorption spectrometer (JASCO V-650). A UV-Vis absorption spectrum of the 2D monolayer assembly of gold nanoparticles of about 50 nm diameter was obtained.

Figure 17:
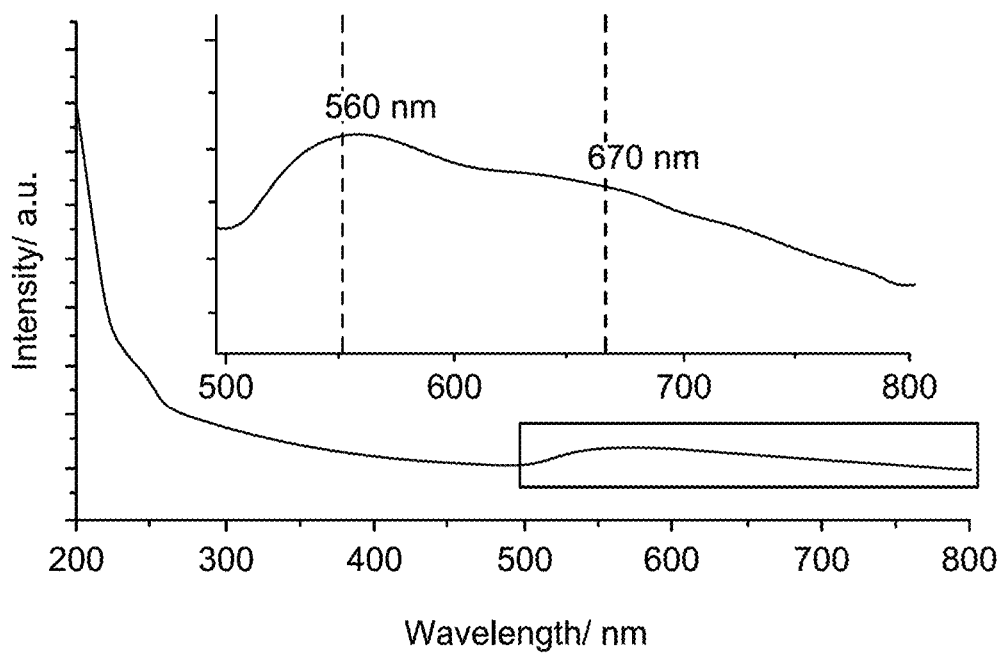
FIG. 17 shows a UV-Vis absorption spectrum of 2D monolayer assembly of gold nanoparticles of 50 nm diameter.

Referring now to FIG. 17, which shows a UV-Vis absorption spectrum of the 2D monolayer assembly of gold nanoparticles of 50 nm diameter. In the case of an aqueous solution, a peak at about 540 nm represents a signature plasmon band of suspended gold colloids, whereas such a plasmon band was found to be split up into two bands for the 2D monolayer assembly of gold nanoparticles of 50 nm diameter, one at shorter wavelength region (about 560 nm) and the other one at longer wavelength region (about 670 nm). The additional shoulder peak at 670 nm was attributed to longitudinal plasmon mode due to the fine assembly of the constituent gold nanoparticles.

Example 5: Fast Fourier Transform (FFT) Analysis of the 2D Monolayer Assembly of Gold Nanoparticles A high-resolution SEM micrograph of the 2D monolayer assembly of gold nanoparticles was utilized to extract a 2D FFT image.

Figure 18:
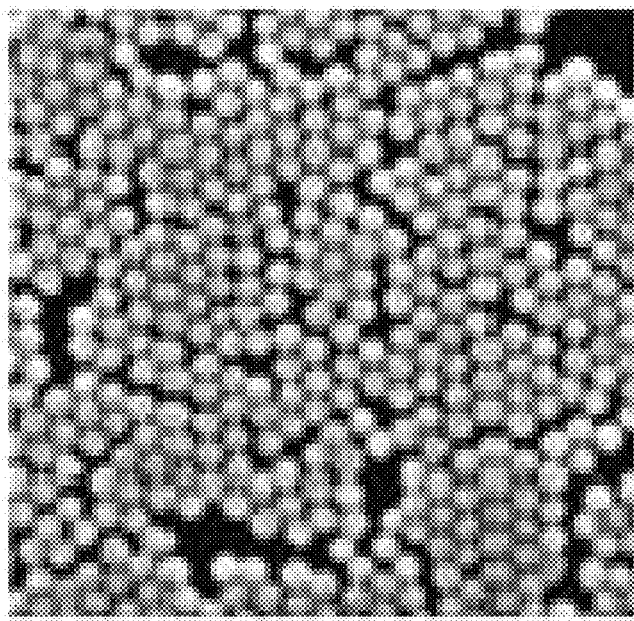
FIG. 18 shows a high-resolution SEM micrograph of the nanoassembly used for 2D Fast Fourier Transform (FFT) analysis.

Referring now to FIG. 18, which shows a high-resolution SEM micrograph utilized to extract the 2D FFT image.

Figure 19:
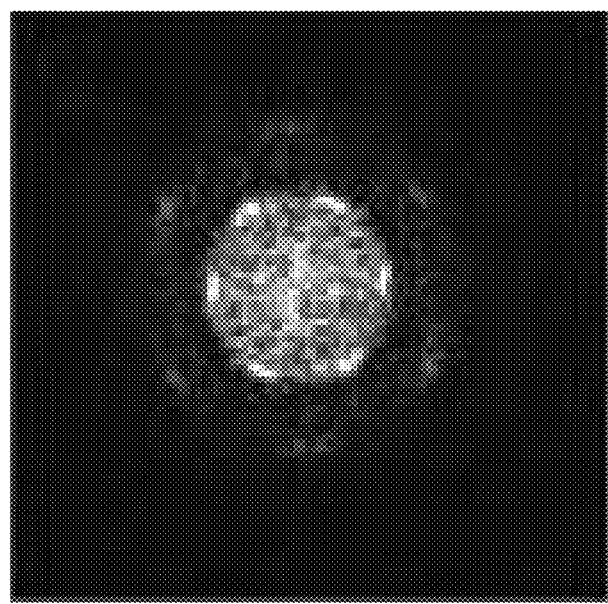
FIG. 19 shows a 2D FFT image obtained after 2D FFT analysis.

Referring now to FIG. 19, which shows the 2D FFT image obtained after 2D FFT analysis of the high-resolution SEM micrograph of the 2D monolayer assembly of gold nanoparticles. The image revealed a six-fold symmetry which was attributed to the hexagonal pattern of the constituent gold nanoparticles.

Example 6: SERS Measurement of CV Using the 2D Monolayer Assembly of Gold Nanoparticles SERS-activity was elucidated and validated using Raman-active CV dye ($C_{25}H_{30}ClN_3$). CV was used as received from Chroma Gesellschaft Schmid GMBH & Co. The 2D monolayer assembly of gold nanoparticles was incubated in an aqueous solution of the CV of different molarities for 10 minutes and washed with a large amount of deionized water. The SERS measurements were carried out by a microscopic Raman measurement system (Renishaw Micro-Raman System 1000) at 514.5 nm excitation. The signal was recorded with a single spectrometer of a focal distance of 25 cm and a grating of 1800 lines/mm for 30 seconds of exposure time. The scattered light was filtered by a subtractive double monochromator (Photon design) and forwarded to a detection scheme by a single spectrometer (Sopra UHRS F1500) with liquid nitrogen cooled charge-coupled device (Roper Scientific). The measurements were carried out in a backscattering configuration.

Figure 20:
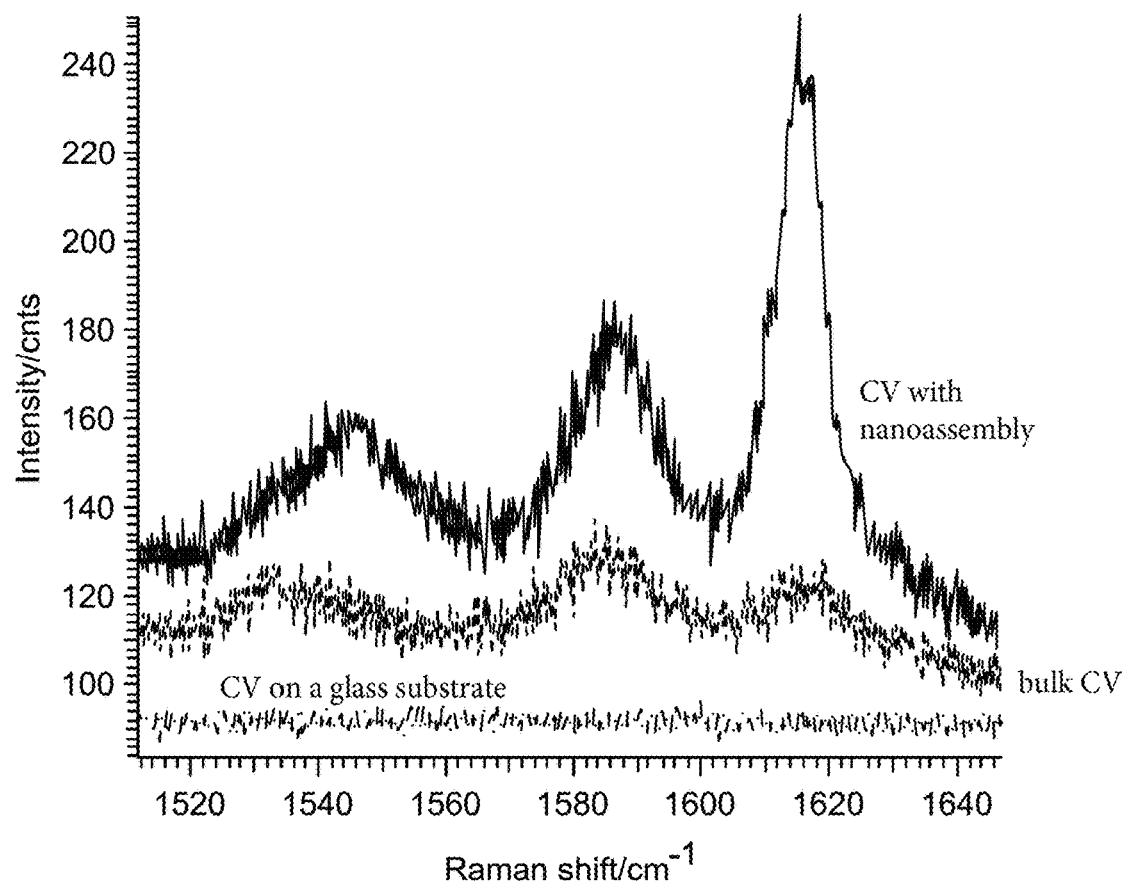
FIG. 20 shows Raman spectra of bulk CV, CV with bare glass substrate, and CV with nanoassembly.

Referring now to FIG. 20, which shows Raman spectra of bulk CV (about 0.2 M), CV (about $1\times10^{-7}$ M) without the 2D monolayer assembly of gold nanoparticles i.e., on a bare glass substrate, and CV (about $1\times10^{-7}$ M) with the 2D monolayer assembly of gold nanoparticles of about 50 nm diameter. SERS signal enhancement by several orders of magnitude was observed in the Raman spectrum of CV (about $1\times10^{-7}$ M) with the nanoassembly as compared with the spectra of bulk CV (about 0.2 M) and CV (about $1\times10^{-7}$ M) with the bare glass substrate.

An enhancement factor (EF) was calculated by using the following equation [Hossain et al., Mater. Sci. Forum 754, 143-169, 2013; Hossain et al., Curr. Sci. 97, 192-201, 2009; Hossain et al., Anal. Bioanal. Chem. 394, 1747-1760, 2009]:

$$EF = \frac{I_{SERS}}{I_{bulk}} \times \frac{M_{bulk}}{M_{SERS}} \qquad (1)$$

Where $I_{SERS}$ and $I_{bulk}$ represents intensities of SERS and Raman measurements at a specific vibrational mode, respectively, $M_{SERS}$ and $M_{bulk}$ represent molarities of molecules used in the SERS and Raman measurements, respectively.

The EF was estimated to be as high as $10^8$. It was also noted that the EF was found to be different for two different vibrational modes of CV (i.e. 1619 cm$^{-1}$ and 1586 cm$^{-1}$).

Figure 21:
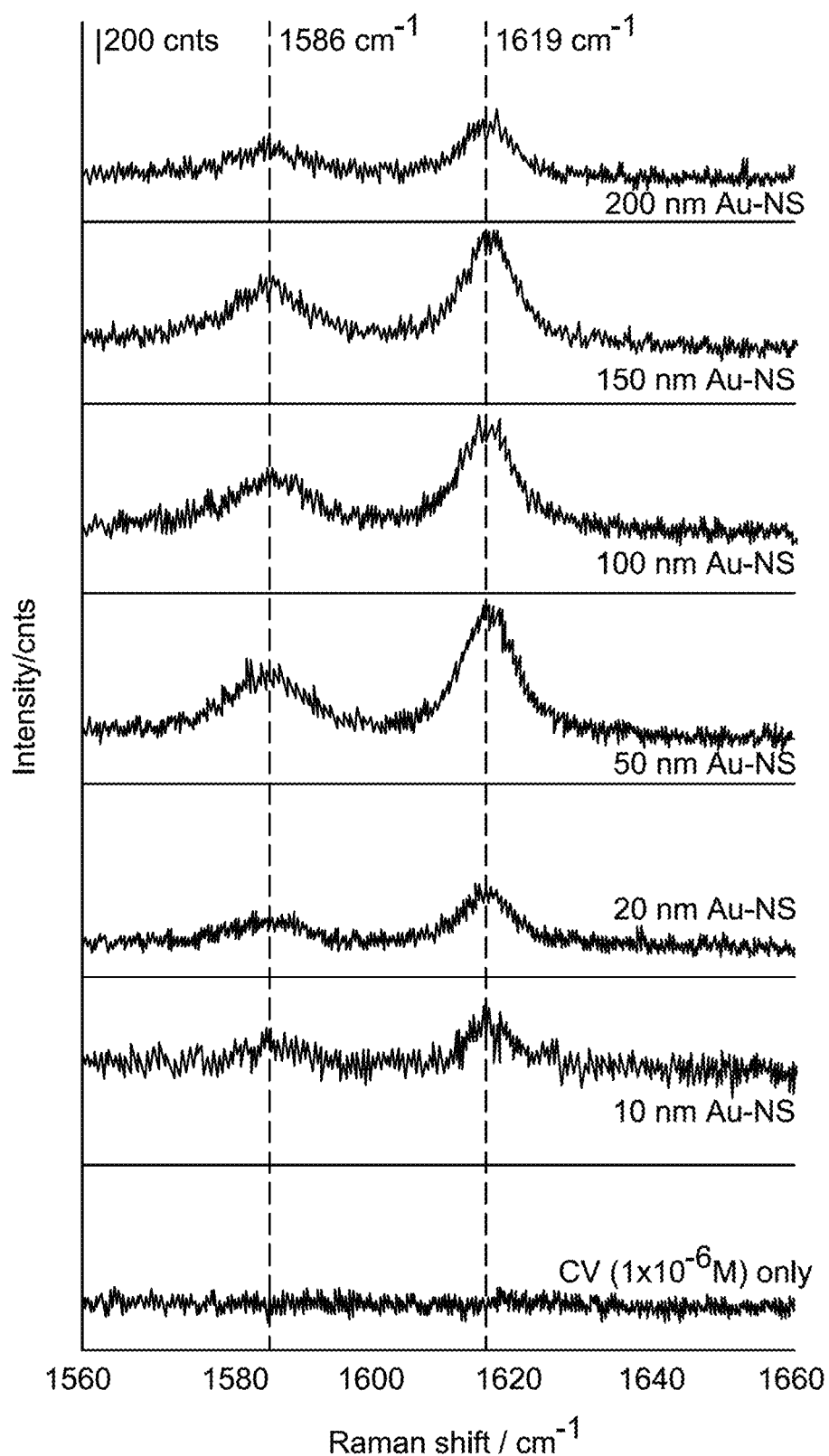
FIG. 21 shows SERS spectra of CV adsorbed on 2D monolayer assemblies of gold nanoparticles of 20 nm, 50 nm, 80 nm, 100 nm, 150 nm, and 200 nm diameter.

Referring now to FIG. 21, which shows SERS spectra of CV adsorbed on the 2D monolayer assemblies of gold nanoparticles of 20 nm, 50 nm, 80 nm, 100 nm, 150 nm, and 200 nm diameter. The SERS spectrum of the CV of very low concentration (i.e. $1\times10^{-6}$ M) without the nanoassembly was found to have no Raman peaks. The SERS spectra of the CV of very low concentration (i.e., $1\times10^{-6}$ M) adsorbed on the constituent nanoparticles of the nanoassemblies of gold nanoparticles of 10 nm, 20 nm, 50 nm, 100 nm, 150 nm, and 200 nm diameter, showed Raman peaks. The intensities of the vibration bands were found to be low when CV molecules were adsorbed on the nanoassembly of gold nanoparticles of 10 nm diameter. The SERS intensity was observed to be increasing with the increasing diameter of constituent nanoparticles of the nanoassembly, but the intensity started to decrease once the size of the constituent nanoparticles crossed 50 nm of diameter.

Vibrational bands at 1619 cm$^{-1}$ (C-phenyl in-plane anisotropic stretching mode, $v_{138}:\alpha_1$) and 1586 cm$^{-1}$ (C-phenyl in-plane anisotropic stretching mode, $v_{136,7}$: e) in the SERS spectra of CV adsorbed on the nanoassemblies of gold nanoparticles of 20 nm, 50 nm, 80 nm, 100 nm, 150 nm, and 200 nm diameter, were further analyzed to understand how the SERS signal enhancement behaves for the different constituent nanoparticles sizes.

Figure 22:
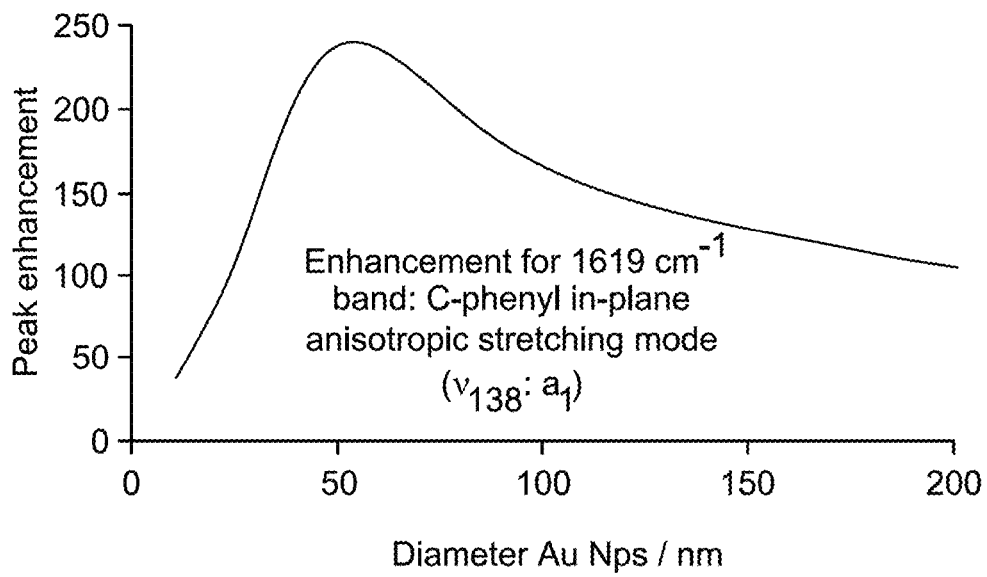
FIG. 22 shows a plot of intensity enhancement of C-Phenyl in-plane anisotropic stretching mode ($v_{138}$: $\alpha_1$, 1619 $cm^{-1}$) of CV versus size of constituent nanoparticles of nanoassembly.

Referring now to FIG. 22, which shows a plot of the intensity enhancements of C-phenyl in-plane anisotropic stretching mode ($v_{138}:\alpha_1$, 1619 cm$^{-1}$) of CV versus size of constituent nanoparticles of the nanoassembly. It was observed that the vibrational band at 1619 cm$^{-1}$ showed higher enhancement at constituent nanoparticles size of 50 nm diameter.

Figure 23:
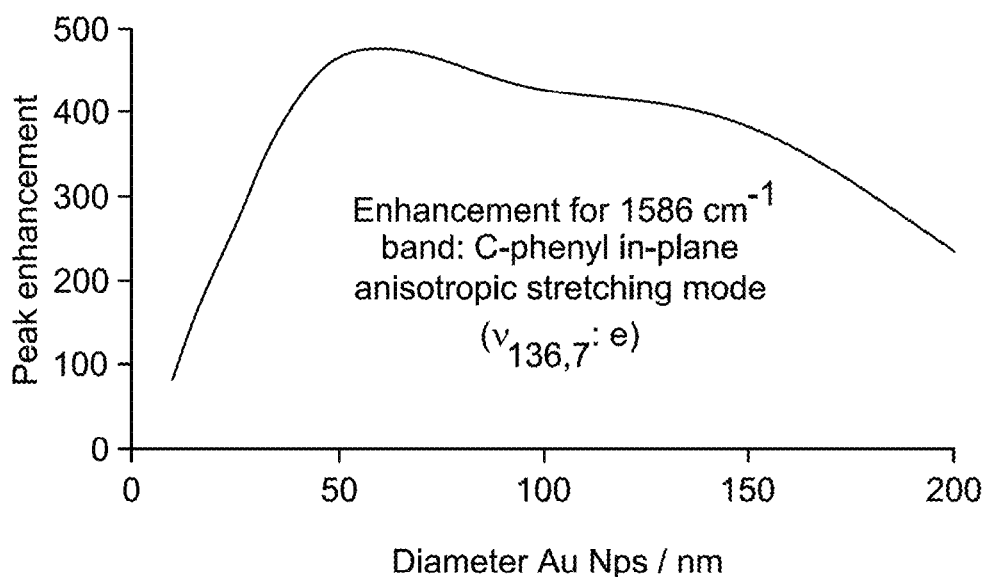
FIG. 23 shows a plot of intensity enhancement of C-Phenyl in-plane anisotropic stretching mode ($v_{136,7}$: e, 1586 $cm^{-1}$) of CV versus size of constituent nanoparticles of nanoassembly.

Referring now to FIG. 23, which shows a plot of intensity enhancements of C-Phenyl in-plane anisotropic stretching mode ($v_{136,7}$: e, 1586 cm$^{-1}$) of CV versus size of constituent nanoparticles of the 2D monolayer assembly of gold nanoparticles. A broadened enhancement trend for the vibrational band at 1586 cm$^{-1}$ was observed for the nanoassemblies of gold nanoparticles of 50 nm to 200 nm diameter. The broadened enhancement was attributed due to the orientation of the absorbed molecules, and variation in induced EM near-field distribution in the nanoscale.

Figure 24:
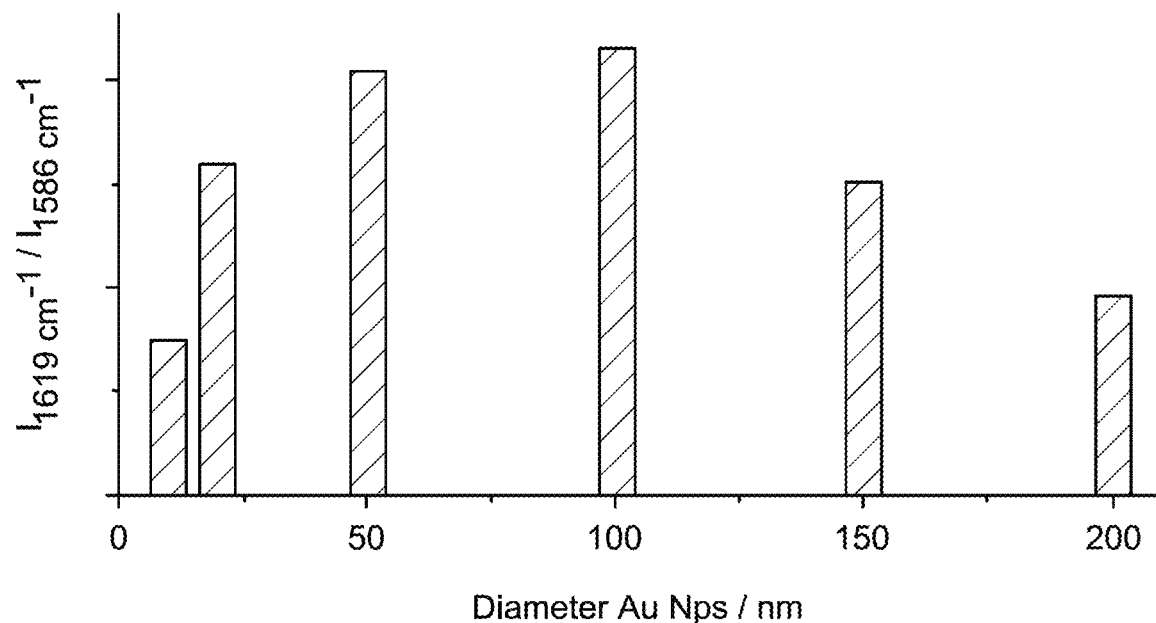
FIG. 24 shows a plot of ratio of intensity enhancement of two C-Phenyl in-plane anisotropic stretching modes (i.e. 1619 $cm^{-1}$ and 1586 $cm^{-1}$) of CV versus size of constituent nanoparticles of nanoassembly.

Referring now to FIG. 24, which shows a plot of the ratio of the intensity enhancements of two C-Phenyl in-plane anisotropic stretching modes (1619 cm$^{-1}$ and 1586 cm$^{-1}$) of CV versus size of the constituent nanoparticles of the 2D monolayer assembly of gold nanoparticles. The plot revealed that the intensity ratio was quite high and almost the same for the nanoassemblies of gold nanoparticles of 20 nm to 150 nm in diameter, whereas smaller nanoparticles, such as 10 nm, and larger nanoparticles, such as 200 nm contributed to lower ratio.

Example 7: Finite-Difference Time-Domain (FDTD) Analysis of the 2D Monolayer Assembly of Gold Nanoparticles Model geometries of isolated nanoparticle (monomer), dimer, and hexagonally assembled close-packed seven nanoparticle units (septamer) of 50 nm diameter were designed. The EM near-field distributions for monomer, dimer, and septamer were analyzed at three specific incident polarization (i.e., s, 45°, and p-polarizations). Although the 2D monolayer assembly of gold nanoparticles was long-range along with the narrow size and interparticle gap distribution, the unit model was designed as simple and symmetric as possible with consistent interparticle gaps of 2 nm. An excitation wavelength i.e., $\lambda_{exe}$ of 532 nm was used for the analysis.

It is well known that SERS enhancement depends on molecular polarizability (chemical enhancement, CE mechanism) and localized EM-field (EM mechanism). Strong EM-fields induced at hotsites play a key role in the SERS study. The EM-field enhancement in surface-enhanced optical processes involves incident photon-localized SPR interaction (marked as M1 enhancement) and scattered photon-localized SPR interaction (marked as M2 enhancement).

The enhancement factor for SERS, M, is given by equation 2:

$$M = \left|\frac{E^{loc}(\lambda_L)}{E^I(\lambda_L)}\right|^2 \times \left|\frac{E^{loc}(\lambda_L \pm \lambda_R)}{E^I(\lambda_L \pm \lambda_R)}\right|^2 = M_1(\lambda_L) \times M_2(\lambda_L \pm \lambda_R) \quad (2)$$

Where $E^I$, $E^{loc}$, $\lambda_L$, $+\lambda_R$, $-\lambda_R$, $M_1$, $M_2$ represents an incident field, local field, excitation wavelength, anti-Stokes wavelength shift, Stokes wavelength shift, first enhancement factor, and second enhancement factor, respectively.

Isolated nanoparticle was not the point of interest since it does not generate any interstitial. Interstitial is obvious in archetype dimer. At least 12 interstitials (i.e. 4 along 3 horizontal axes, 4 along 3 interparticle axes of 45°, and 4 along 3 interparticle axes of) 135° are found in septamer.

Figure 25:
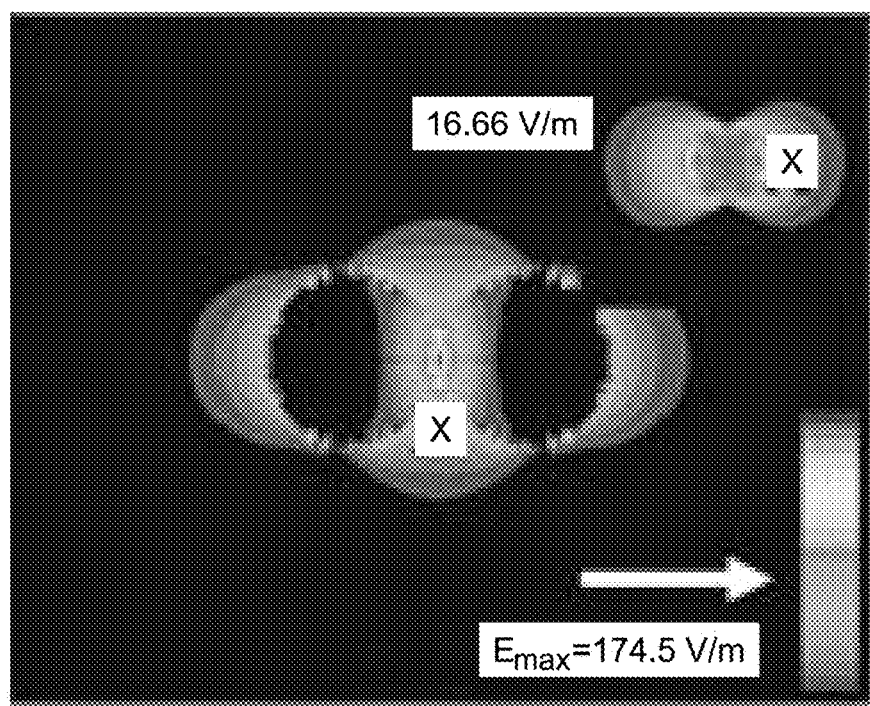
FIG. 25 shows EM near-field distribution of dimer of gold nanoparticles at s-polarization.
Figure 26:
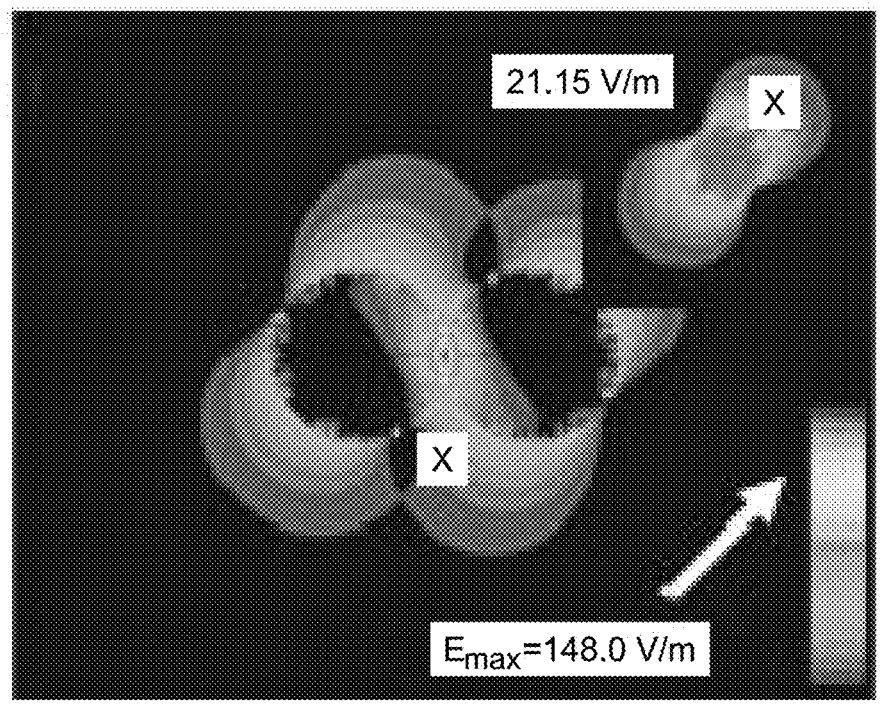
FIG. 26 shows EM near-field distribution of dimer of gold nanoparticles at 45°—polarization.
Figure 27:
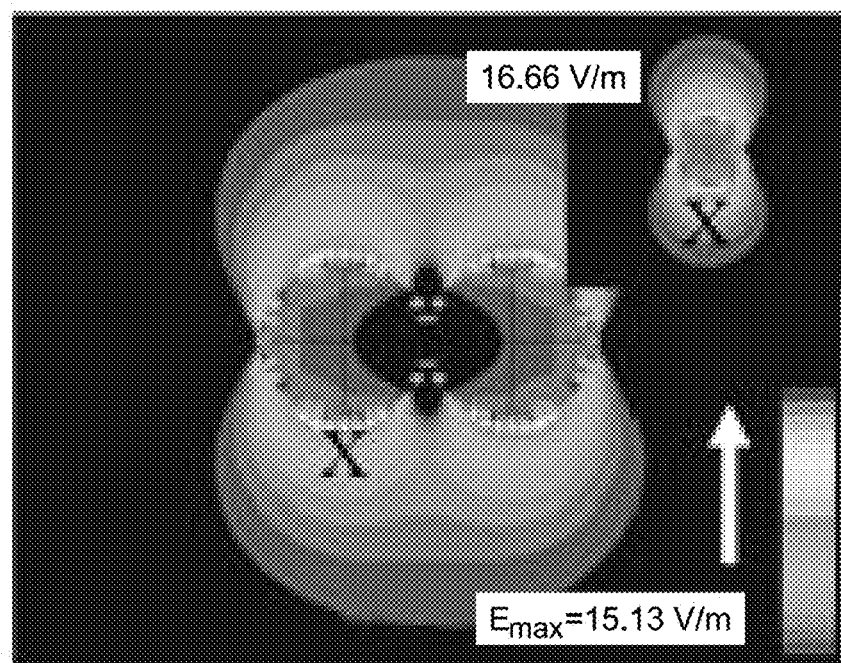
FIG. 27 shows EM near-field distribution of dimer of gold nanoparticles at p-polarization.

Referring now to FIG. 25 to FIG. 27, which shows the EM near-field distribution of dimer of gold nanoparticles at s, 45°, and p-polarization, respectively. The strongest and most confined EM near-field (i.e., $E_{max}$=174.5 V/m) distribution was observed at s-polarization (FIG. 25) compared to those obtained at 45°, and p-polarization. This was attributed due to the strong coupling between individual EM near-field distribution. The EM near-field distribution was almost negligible (i.e., $E_{max}$=15.13 V/m) at p-polarization (FIG. 27), which was similar to that of the single gold spheroid (i.e., $E_{max}$=16.66 V/m) as shown in the inset. The EM near-field distribution of dimer of the gold spheroids with 45° polarization was found to be still very high (i.e. $E_{max}$=148.0 V/m) as compared to that of the single gold spheroid (i.e., $E_{max}$=21.15 V/m). FIG. 25 to FIG. 27 revealed that the polarization-dependent plasmon coupling in the interstitials facilitates confine and enhances local electric field distribution. The close-packed gold nanoparticle units were populated with such interstitials.

Figure 28:
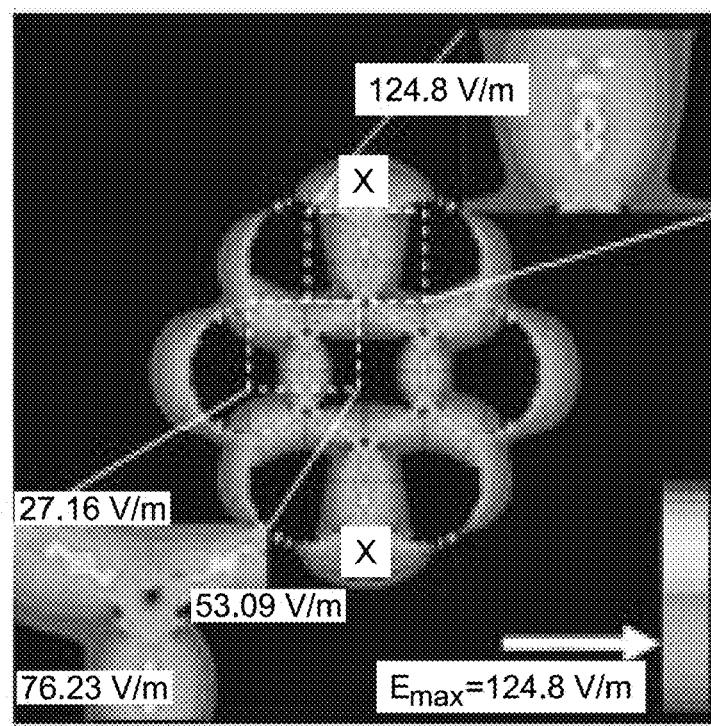
FIG. 28 shows EM near-field distribution of septamer of gold nanoparticles at s-polarization.

Referring now to FIG. 28, which shows the EM near-field distribution of septamer of gold nanoparticles at s-polarization. At s-polarization, the maximum EM near-field distribution observed at interstitials along the top and bottom horizontal axes (indicated by X) was higher as compared to those obtained at other interstitials. A zoom-in view of the strongest hotsite (i.e., $E_{max}$=124.8 V/m), marked by a dashed white rectangle, shown in the top-right corner inset of FIG. 28, clearly confirmed the strongest EM-field localization and gradual distribution surrounding the center of such interstitial. Three more active sites next to the strongest one with a strong EM-field (i.e., $E_{max}$ of 77.16 V/m, 76.23 V/m, and 53.09 V/m) are marked as a dashed white rectangle and shown in the bottom-left corner of FIG. 28.

Figure 29:
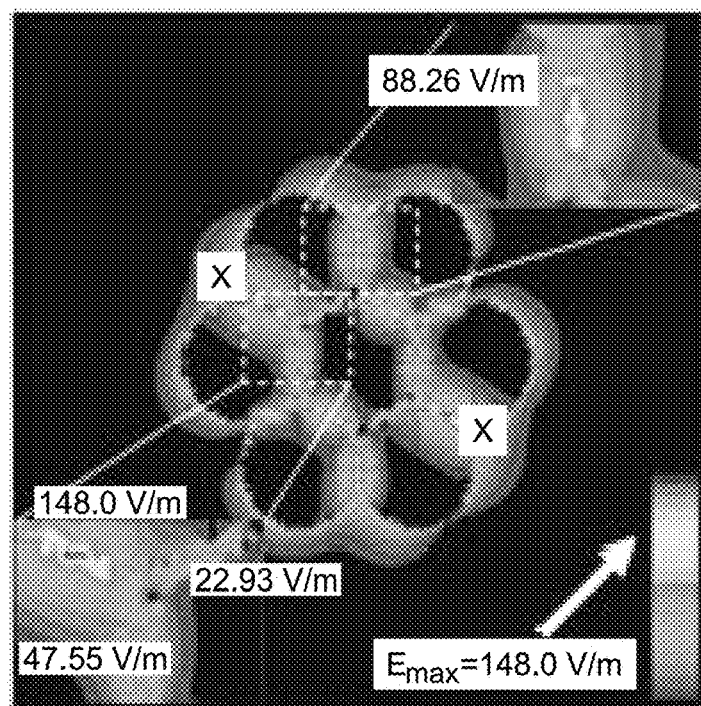
FIG. 29 shows EM near-field distribution of septamer of gold nanoparticles at 45°—polarization.

Referring now to FIG. 29, which shows the EM near-field distribution of septamer of gold nanoparticles at 45°—polarization. It was observed that reasonably more active sites with moderate to high EM-field distributions were attainable. A zoom-in view of the strongest hotsite (i.e., $E_{max}$=148.0 V/m) as well as two moderate sites (i.e., $E_{max}$ of 47.55 V/m and 22.93 V/m) are marked by a dashed white rectangle and shown in the bottom-left corner inset of FIG. 29. Confined and strong EM-field localization and gradual distribution surrounding the center of such interstitials were observed. The interstitial showing the strongest EM-field localization at s-polarization were having reasonably higher EM-field distribution (i.e. $E_{max}$=88.26 V/m) at 45°—polarization. A zoom-in view of such a site is marked by a dashed white rectangle there and shown in the top-right corner of FIG. 29.

Figure 30:
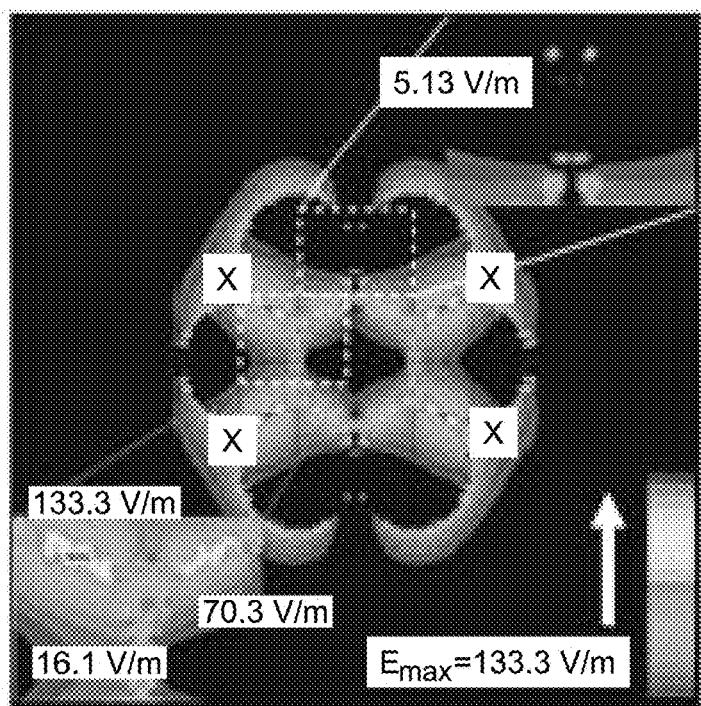
FIG. 30 shows EM near-field distribution of septamer of gold nanoparticles at p-polarization.

Referring now to FIG. 30, which shows the EM near-field distribution of septamer of gold nanoparticles at p-polarization. Confined EM-field distributions were observed at the interstitials along diagonal axes (indicated by X). A zoom-in view of the strongest hotsite (i.e., $E_{max}$=133.3 V/m) as well as two strong sites (i.e., $E_{max}$ of 70.3 V/m and 16.1 V/m) are marked by a dashed white rectangle therein and shown in bottom-left corner inset of FIG. 30. Confined and strong EM-field localization and gradual distribution surrounding the center of such interstitials were observed. The interstitials showing the strongest EM-field localization at s-polarization were having very negligible EM-field distribution (i.e., $E_{max}$=3.13 V/m) at p-polarization. A zoom-in view of such a site is marked by a dashed white rectangle there and shown in the top-right corner of FIG. 30.

The localized and confined EM-field distributions were observed at all the interstitials regardless of the incident polarization in the case of septamer of gold nanoparticles.

Due to the presence of abundant hotsites i.e., localized EM-field in the 2D monolayer assembly of gold nanoparticles, a strong enhancement in the SERS signal was observed.

Example 8: Continuum Surface Force (CSF) Simulation

The CSF model was employed to understand vortexes involved in the double slide method [Brackbill et al., J. Comput. Phys. 100, 335-354, 1992]. Navier-Stokes and the continuum equations were solved by the projection method [Chorin et al., Math. Comput. 22, 745-762, 1968]. The volume tracking method used for capturing fluid-air interface was based on the multi-interface advection and reconstruction solver (MARS) method [Kunugi, T, Computational Fluid Dynamics J 563-571, 2001; Hara et al., APS Division of Fluid Dynamics Meeting Abstracts 64, G13-010, 2011], which is similar to the piecewise linear interface construction (PLIC) algorithm [Youngs et al., Numerical Methods for Fluid Dynamics, 1982] and is based on the volume of fluid (VOF) method [Hirt et al., J. Comput. Phys. 39, 201-225, 1981]. The MARS method has a high performance of volume conservation as an interfacial tracking method. Cylindrical-coordinate axes were used for two plane disks placed parallel to each other with a separation distance of 1 mm, corresponding to the size and shape of droplets used for preparing the 2D monolayer assembly of gold nanoparticles. The calculations were performed with a mesh of $r_{mesh} \times z_{mesh}$=250×50 with spatial steps $\Delta r$=2.0×10$^{-5}$ [m], $\Delta z$=2.0× 10$^{-5}$ [m] and a time step of $\Delta t$=1.0×10$^{-4}$ [s]. The equations were solved with a boundary condition that fixed the fluid at the substrate surface. It was assumed that vaporization of the droplet occurred predominantly at the contact line with the substrate surface. This is reasonable because heterogeneous nucleation theory shows that the contact line region is thermodynamically unstable with large free energy. A simple boundary condition, $dF/dt=-k_{evap}$ was used for evaporation, where F is a volume fraction of the liquid phase in each cell. Taking the vaporization rate to be $k_{evap}=5.0\times10^2$ [l/s], the droplet vaporized along a circle of an isogram with F=0.5 where the droplet and solid surface are in contact. Instead of considering individual particle motions, the diffusion behavior of gold nanoparticles in solution was simply simulated by using the diffusion equation. To know the fluid dynamical effect, it was assumed that particles stick to the substrate surface when they were concentrated above a threshold value in the cells at the interface.

The characteristics of vortexes at the meniscus and the supply of constituent nanoparticles were found to be important in the formation of the 2D monolayer assembly of gold nanoparticles without using any surfactants.

Figure 31:
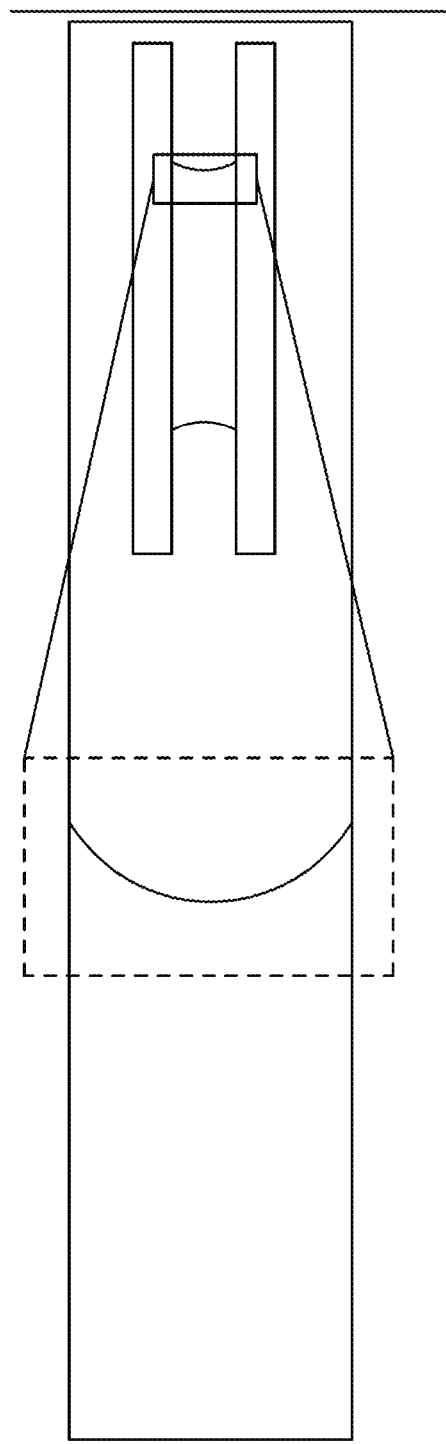
FIG. 31 represents a schematic of a model of double slide structure.

Referring now to FIG. 31, which represents a free-hand schematic of the model of the double slide structure.

Figure 32:
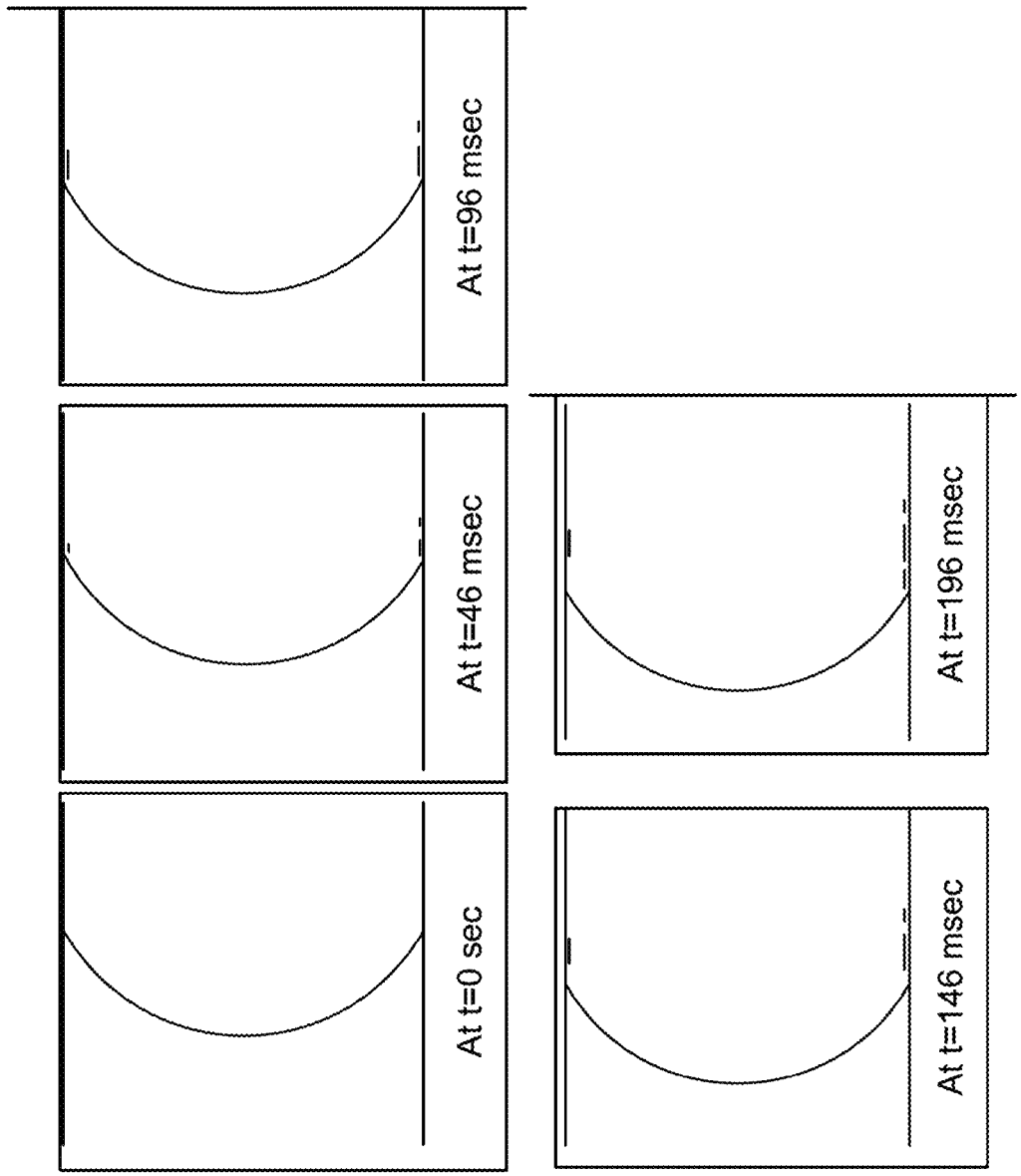
FIG. 32 illustrates receding of liquid-air interface at different time frames.

Referring now to FIG. 32, which illustrates a time-dependent movement of the fluid-air interface under vaporization for the double slide method. The contact line receded, resulting in nanoparticles sticking to the substrate surface, as time went by. It is worth noting that the sticking is not continuous but with strips of an irregular interval, qualitatively well reproducing the 2D monolayer assembly growth manner.

Figure 33:
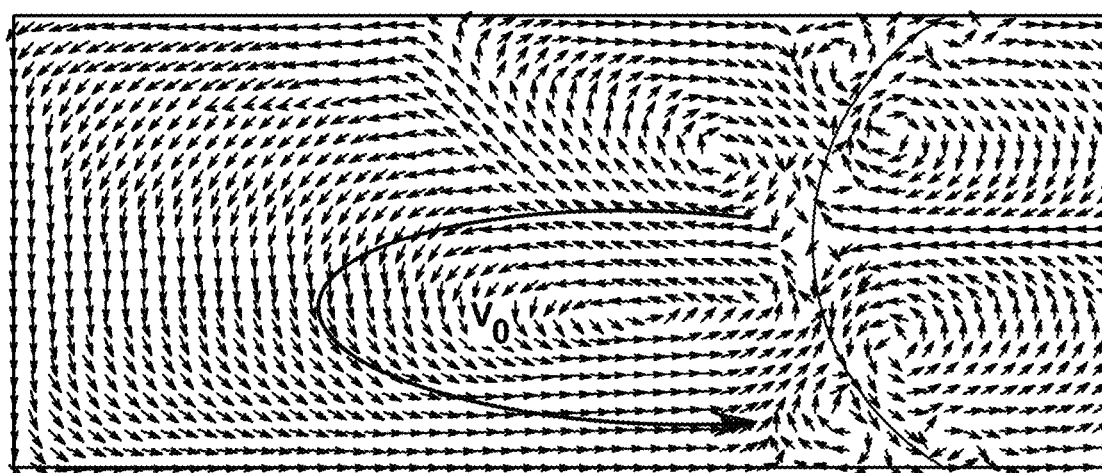
FIG. 33 shows velocity vector of liquid in double slide model.
Figure 34:
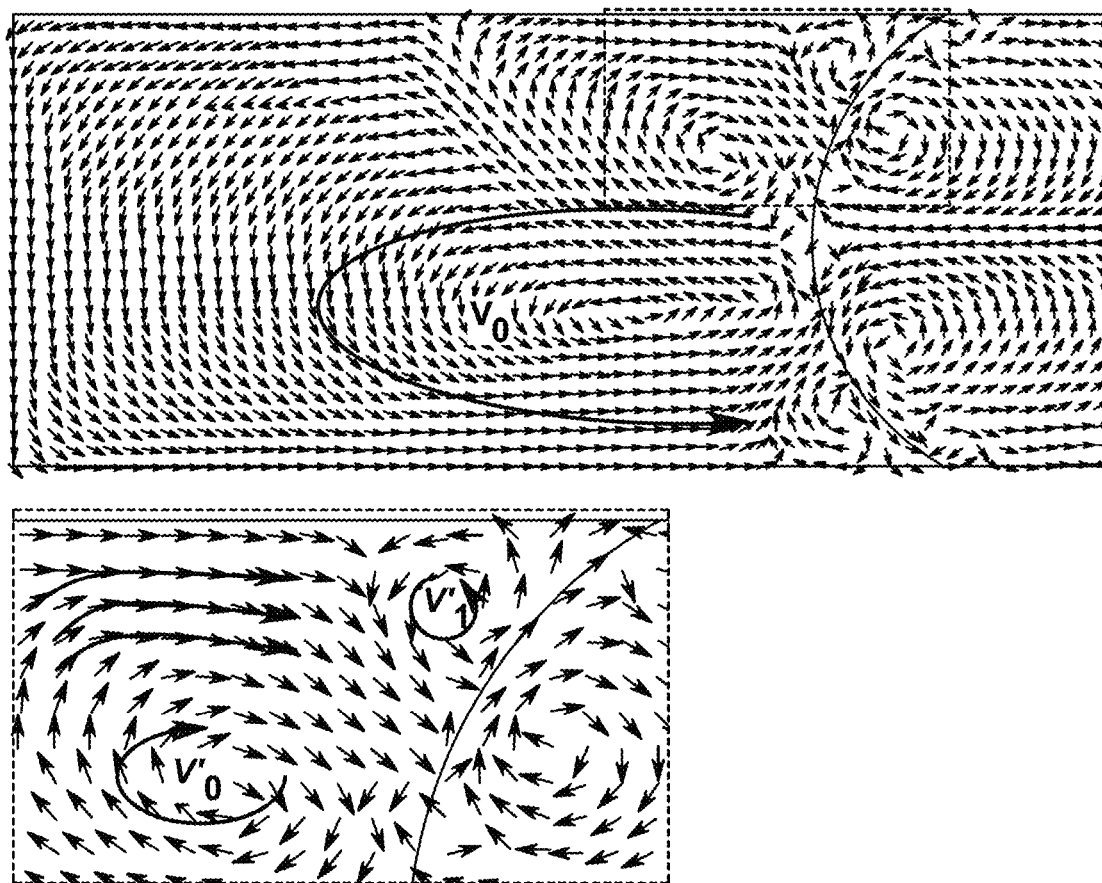
FIG. 34 shows a zoom-in view of rectangular area in velocity vector of liquid in double slide model illustrating weak primary vortex ($V'_0$), and secondary vortex ($V'_1$).
Figure 35:
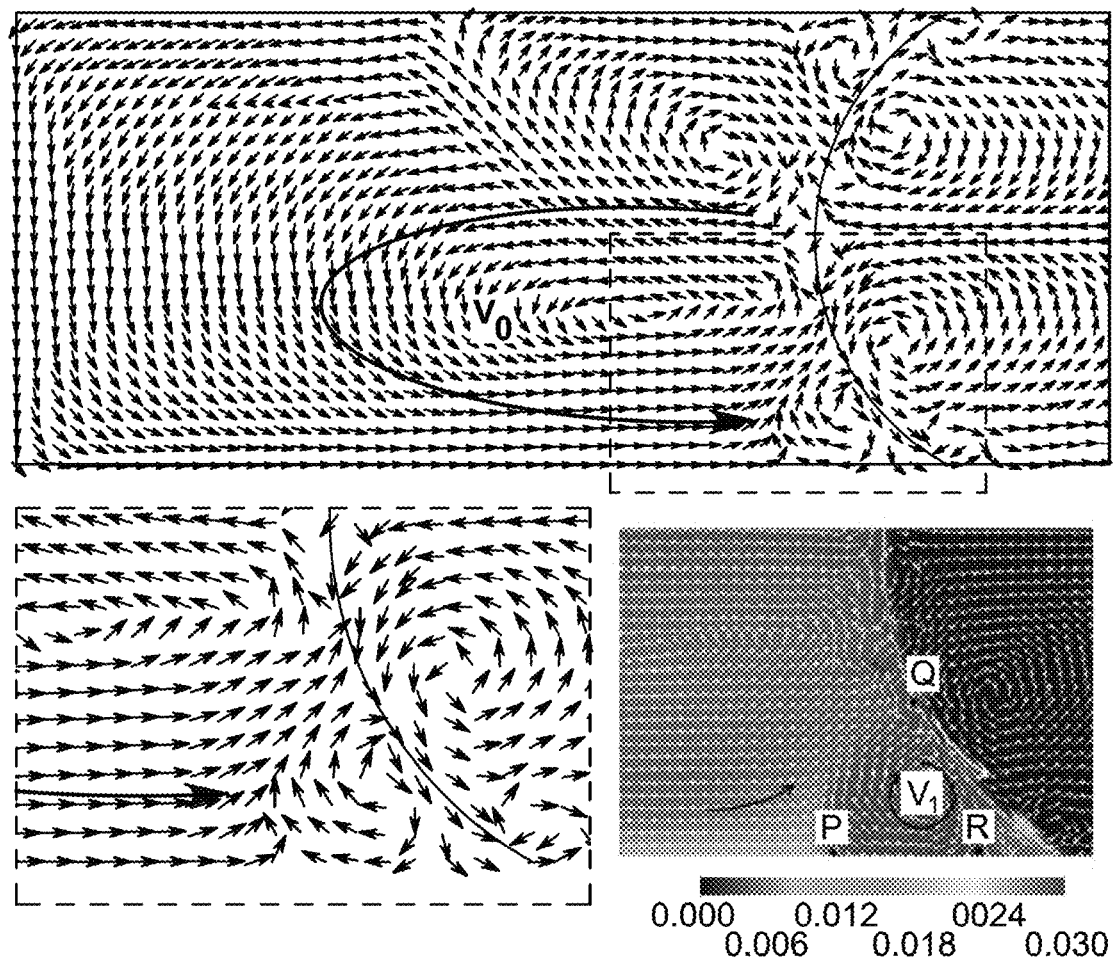
FIG. 35 shows a zoom-in view of a rectangular area in velocity vector of liquid in double slide model illustrating flow of nanoparticles near meniscus.

Referring now to FIG. 33 to FIG. 35, which shows the velocity vector of liquid in the double slide model. The CSF simulation revealed that there were distributions of velocity vectors of fluid in different regions. A flow from the middle of the fluid-air interface was observed to move inward horizontally and tune downward and upward instantly. The movement toward the downward turned again outward horizontally making a big circulation movement (strong primary vortex, $V_0$). On the other hand, the upward movement returned outward horizontally making relatively a smaller circulation movement (weak primary vortex, $V'_0$) (FIG. 34). Interestingly, the simulation also unveiled secondary vortexes marked as $V'_1$ and $V_1$ in FIG. 34 and FIG. 35, respectively. The secondary vortex, $V_1$ at the meniscus of the lower interface was found bigger compared to $V'_1$ at the meniscus of the upper interface. In addition, the vortex $V_1$ was supported by the strong primary vortex $V_0$, whereas the vortex $V'_1$ was supported by the weak primary vortex $V'_0$. FIG. 35 revealed that the nanoparticles were carried along from the point P to Q, and branched off into two flows, one moving inward horizontally and the other along the contact line, Q near the meniscus and thus developing another vortex, $V_1$ near the meniscus. In this way, the constituent nanoparticles were continuously supplied and supported to form the 2D monolayer assembly of gold nanoparticles near the meniscus.

The invention claimed is:

1. A method for forming a substrate having a gold surface for surface-enhanced Raman scattering (SERS), comprising:
   forming a monolayer assembly on a first glass substrate by:
      dropping a 200-400 μL aliquot of a colloid of gold nanoparticles onto the first glass substrate to form a film;
      placing a second glass substrate onto the film, wherein the colloid is disposed between the first and second glass substrates and the first and second glass substrates are spaced 0.1-2 mm apart;
      irradiating the colloid disposed between the first and second glass substrates with infrared light to evaporate the solvent to form the monolayer assembly of gold nanoparticles, wherein the monolayer assembly of gold nanoparticles includes a plurality of strips of gold nanoparticles spaced 25 μm apart and wherein each gold nanoparticle of the plurality of strips of gold nanoparticles is adjacent to at least six other gold nanoparticles;
   dissolving the compound in water to form a solution;
   adding the first glass substrate at least partially coated with the gold nanoparticles to the solution to form a mixture;
      wherein the gold nanoparticles are in a monolayer assembly on the first glass substrate;
      wherein the gold nanoparticles are 20-200 nm in size;
      wherein a surface of the gold nanoparticles is not functionalized with an outer shell;
   wherein the monolayer assembly is formed without a surfactant or linker;
   removing the first glass substrate from the mixture and washing with water to form a SERS sample having at least a portion of molecules of the compound adsorbed to the gold nanoparticles on the first glass substrate; and
   recording a SERS spectrum of the SERS sample;
   wherein the SERS signal of the SERS spectrum is higher than a SERS signal of a SERS spectrum of the compound on a different substrate without the gold nanoparticles.

2. The method of claim 1, wherein the size of the gold nanoparticles in the monolayer assembly varies by no more than 15 nm.

3. The method of claim 1, wherein the gold nanoparticles have an interparticle gap of 1-15 nm in the monolayer assembly.

4. The method of claim 1, wherein the gold nanoparticles have an interparticle gap of 2-6 nm in the monolayer assembly.

5. The method of claim 1, wherein the monolayer assembly of gold nanoparticles is 50-100 μm in size.

6. The method of claim 1, wherein the SERS signal is enhanced $10-10^8$ times that of the compound on a substrate without the gold nanoparticles.

7. The method of claim 1, wherein the compound is selected from a group consisting of a triphenylmethane derivative, a rhodamine derivative, a phthalimide derivative, and a phycoerythrin derivative.

8. The method of claim 1, wherein the compound is crystal violet.

9. The method of claim 1, wherein the monolayer assembly of gold nanoparticles has a maximum absorption signal at 500-700 nm.

10. The method of claim 1, wherein the SERS sample is irradiated with 500-550 nm light to record the SERS spectrum.

11. The method of claim 1, wherein the gold nanoparticle monolayer assembly on the substrate has an electromagnetic field intensity of 100-175 V/m.

12. The method of claim 1, wherein the first and second glass substrates are spaced 1 mm apart.

13. The method of claim 12, wherein the colloid comprises a solvent selected from the group consisting of water, ethanol, methanol, and isopropanol.

* * * * *